United States Patent
Zhang et al.

(10) Patent No.: US 10,412,613 B2
(45) Date of Patent: Sep. 10, 2019

(54) CHANNEL STATE INFORMATION MEASURING METHOD AND APPARATUS

(71) Applicant: ZTE CORPORATION, Shenzhen (CN)

(72) Inventors: Chenchen Zhang, Shenzhen (CN); Yu Ngok Li, Shenzhen (CN); Yajun Zhao, Shenzhen (CN); Liyuan Zhong, Shenzhen (CN); Juan Liu, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 15/746,124

(22) PCT Filed: Jul. 13, 2016

(86) PCT No.: PCT/CN2016/089915
§ 371 (c)(1),
(2) Date: Apr. 2, 2018

(87) PCT Pub. No.: WO2017/016387
PCT Pub. Date: Feb. 2, 2017

(65) Prior Publication Data
US 2018/0213429 A1    Jul. 26, 2018

(30) Foreign Application Priority Data

Jul. 30, 2015 (CN) .......................... 2015 1 0458970

(51) Int. Cl.
*H04W 24/10* (2009.01)
*H04W 24/02* (2009.01)
(Continued)

(52) U.S. Cl.
CPC ............ *H04W 24/10* (2013.01); *H04B 17/30* (2015.01); *H04L 5/001* (2013.01); *H04L 5/0053* (2013.01);
(Continued)

(58) Field of Classification Search
CPC ..... H04W 24/10; H04W 24/02; H04W 16/14; H04B 17/30; H04L 27/0006; H04L 5/0057; H04L 5/0053; H04L 5/001
See application file for complete search history.

(56) References Cited

U.S. PATENT DOCUMENTS

2015/0172950 A1   6/2015   Chen et al.
2015/0173056 A1   6/2015   Yerramalli et al.
(Continued)

FOREIGN PATENT DOCUMENTS

CN   104333873 A   2/2015
CN   104540158 A   4/2015
(Continued)

OTHER PUBLICATIONS

International Search Report in international application No. PCT/CN2016/089915, dated Oct. 13, 2016.
(Continued)

*Primary Examiner* — Thai Nguyen
(74) *Attorney, Agent, or Firm* — McDonald Hopkins LLC

(57) ABSTRACT

Disclosed are a channel state information measuring method and apparatus. The method includes: a base station informs a terminal to feed back a channel state information (CSI) measuring result of a carrier set, wherein the carrier set comprises an unlicensed carrier; and the base station receives the CSI measuring result, fed back by the terminal, of the carrier set.

14 Claims, 18 Drawing Sheets

(51) Int. Cl.
*H04B 17/30* (2015.01)
*H04L 5/00* (2006.01)
*H04L 27/00* (2006.01)
*H04W 16/14* (2009.01)

(52) U.S. Cl.
CPC ........ *H04L 5/0057* (2013.01); *H04L 27/0006* (2013.01); *H04W 24/02* (2013.01); *H04W 16/14* (2013.01)

(56) References Cited

U.S. PATENT DOCUMENTS

| | | | | |
|---|---|---|---|---|
| 2015/0245232 | A1* | 8/2015 | Luo | H04W 24/08 370/252 |
| 2015/0289208 | A1 | 10/2015 | Liu et al. | |
| 2016/0007350 | A1* | 1/2016 | Xiong | H04W 24/10 370/252 |
| 2017/0251373 | A1* | 8/2017 | Ding | H04L 5/0048 |

FOREIGN PATENT DOCUMENTS

| | | |
|---|---|---|
| CN | 104579518 A | 4/2015 |
| CN | 105636108 A | 6/2016 |
| WO | 2015089282 A1 | 6/2015 |
| WO | 2015154650 A1 | 10/2015 |

OTHER PUBLICATIONS

English Translation of the Written Opinion of the International Search Authority in international application No. PCT/CN2016/089915, dated Oct. 13, 2016.

* cited by examiner

CHANNEL STATE INFORMATION MEASURING METHOD AND APPARATUS

TECHNICAL FIELD

The disclosure relates to, but not limited to, the field of communications, and particularly to a method and device for measuring Channel State Information (CSI).

BACKGROUND

In an evolution process of an Long Term Evolution (LTE) system, a project was set up in September, 2014, for researches on LTE Release 13 (Rel-13), where an important content is use of an unlicensed carrier by an LTE system for work. An unlicensed carrier, i.e., a license-exempt spectrum, refers to a spectrum or carrier which may be directly used without any license under the condition that a relevant regulation (radio control) of a government department (for example, the State Radio Regulatory Commission) is met. For example, a present 5 GHz frequency band belongs to an unlicensed carrier. Such a technology will enable an LTE system to use a present unlicensed carrier, thereby greatly improving a potential spectrum resource of the LTE system and enabling the LTE system to achieve lower spectrum cost. However, an LTE system may be confronted with many problems when using an unlicensed carrier. At first, in some countries and regions, there are corresponding control policies for use of unlicensed spectrums. For example, in Europe, if operating in an unlicensed carrier, an LTE system is required to support a Listen Before Talk (LBT) mechanism, and may occupy a channel only when a monitoring result is that the channel is idle.

For a present LTE protocol, there exist two types of CSI feedback: periodic CSI feedback and nonperiodic CSI feedback. For an unlicensed carrier, because of existence of an LBT mechanism, it is uncertain about whether a pilot configured for CSI measurement may be sent on the unlicensed carrier on a fixed subframe or not, and it is also uncertain about whether a Physical Uplink Shared Channel (PUSCH) or Physical Uplink Control Channel (PUCCH) containing a CSI feedback may be fed back on the unlicensed carrier or not. Therefore, a present periodic CSI feedback mechanism for a licensed carrier fails to be used any longer. Considering a characteristic of the LBT mechanism for the unlicensed carrier, a mechanism similar to nonperiodic CSI feedback is more suitable for the unlicensed carrier.

In a present protocol version LTE R10, an indication about nonperiodic CSI feedback is sent in a DCI format 0/DCI format 4, the DCI format 4 may provide a good support for multiple carriers and multiple uplink streams, and by indication of a carrier indicator and CSI request character therein, a terminal may learn about carriers on which nonperiodic CSI feedback is required to be performed and a carrier on which a PUSCH is to be sent.

High-layer Radio Resource Control (RRC) signaling may semi-statically notify a terminal of a candidate carrier set, the terminal may learn about a carrier set corresponding to nonperiodic CSI feedback according to indication of a CSI request character, and then the terminal may perform CSI measurement on these carriers and feed back CSI of these carriers in a preset subsequent subframe. From such a mechanism, it can be seen that there may exist such conditions on an unlicensed carrier that CSI fails to be measured, a PUSCH fails to be sent due to a failure in contention for a channel and the like.

For the technical problem that CSI of an unlicensed carrier fails to be measured in a related technology, there is yet no effective solution.

SUMMARY

The below is a summary about a subject described in the disclosure in detail. The summary is not intended to limit the scope of protection of the claims.

The disclosure provides a method and device for measuring CSI, so as to at least solve the problem on an unlicensed carrier that CSI fails to be measured or a PUSCH fails to be sent due to a failure in contention for a channel.

According to an aspect of embodiments of the disclosure, a method for measuring CSI is provided. The method includes the following actions. A base station notifies a terminal to feed back a CSI measurement result of a carrier set, where the carrier set may include unlicensed carriers; and the base station receives the CSI measurement result, fed back by the terminal, of the carrier set.

Optionally, the action of that notifying, by the base station, the terminal to feed back the CSI measurement result of the carrier set may include the following actions. The base station notifies the terminal to feed back the CSI measurement result of the carrier set through at least one of a Physical Downlink Control Channel (PDCCH) or first high-layer RRC signaling.

Optionally, the action of notifying, by the base station, the terminal to feed back the CSI measurement result of the carrier set may include the following actions. The base station sends first indication information to the terminal through at least one of the PDCCH or the first high-layer RRC signaling, where the first indication information may be arranged to indicate the carrier set.

Optionally, during the action of sending, by the base station, the first indication information to the terminal through at least one of the PDCCH or the first high-layer RRC signaling, or, after the action of sending, by the base station, the first indication information to the terminal through at least one of the PDCCH or the first high-layer RRC signaling, the method may further include that the following actions. The base station sends second indication information to the terminal, where the second indication information may be arranged to indicate the unlicensed carriers in the carrier set.

Optionally, before the action of sending, by the base station, the second indication information to the terminal, the method may further include the following actions. The base station generates second high-layer RRC signaling, where an existing bit or newly added bit in the second high-layer RRC signaling may be arranged to indicate whether the carrier set includes the unlicensed carriers or not; and the base station generates the second indication information according to the second high-layer RRC signaling.

Optionally, the action of sending, by the base station, the second indication information to the terminal may include the following actions. The base station sends the second indication information to the terminal in a bitmap manner, where a length of the second indication information may be the same as a number of carriers in the carrier set; or, the length of the second indication information may be the same as a number of the unlicensed carriers in the carrier set.

Optionally, when the base station sends the first indication information to the terminal through at least one of the PDCCH or the first high-layer RRC signaling, under the condition that the base station sends the second indication information to the terminal, the first indication information and the second indication information may be represented by different bits in the same indication information.

Optionally, during the action of sending, by the base station, the first indication information to the terminal through at least one of the PDCCH or the first high-layer RRC signaling, or, after the action of sending, by the base station, the first indication information to the terminal through at least one of the PDCCH or the first high-layer RRC signaling, the method may further include that the following actions. The base station sends third indication information to the terminal, where the third indication information may be arranged to indicate an unlicensed carrier having sent a pilot signal in the unlicensed carriers.

Optionally, when the base station sends the first indication information to the terminal through at least one of the PDCCH or the first high-layer RRC signaling, under the condition that the base station sends the third indication information to the terminal, the first indication information and the third indication information may be represented by different bits in the same indication information.

Optionally, during the action of sending, by the base station, the first indication information to the terminal through least one of the PDCCH or the first high-layer RRC signaling, or, after the action of sending, by the base station, the first indication information to the terminal through at least one of the PDCCH or the first high-layer RRC signaling, the method may further include the following actions. The base station sends fourth indication information to the terminal, where the fourth indication information may be arranged to indicate whether the terminal is allowed to feed back the CSI measurement result of the carrier set or not.

Optionally, the fourth indication information may be represented by an existing bit or newly added bit in the PDCCH, where the fourth indication information, when being a first predetermined value, may be arranged to indicate that the terminal is allowed to feed back the CSI measurement result of the carrier set, and the fourth indication information, when being a second predetermined value, may be arranged to indicate that the terminal is not allowed to feed back the CSI measurement result of the carrier set.

Optionally, when the base station sends the first indication information to the terminal through at least one of the PDCCH or the first high-layer RRC signaling, under the condition that the base station sends the fourth indication information to the terminal, the first indication information and the fourth indication information may be represented by different bits in the same indication information.

Optionally, the method may further include the following actions. The base station sends authorization indication information to the terminal under the condition of not receiving the CSI measurement result within a predetermined time, where the authorization indication information may be arranged to indicate the terminal to feed back the CSI measurement result on one or more licensed carriers; and the base station receives the CSI measurement result sent by the terminal on the one or more licensed carriers.

Optionally, before the action of notifying, by the base station, the terminal to feed back the CSI measurement result of the carrier set, the method may further include one of the following actions. The base station adds the unlicensed carriers in a first carrier set only including licensed carriers or a second carrier set only including licensed carriers to obtain the carrier set; the base station adds the unlicensed carriers in both the first carrier set only including the licensed carriers and the second carrier set only including the licensed carriers, and selects the first carrier set added with the unlicensed carriers or the second carrier set added with the unlicensed carriers as the carrier set; and the base station sets a third carrier set except the first carrier set only including the licensed carriers and the second carrier set only including the licensed carriers, where the third carrier set may include the unlicensed carriers.

Optionally, before the action of receiving, by the base station, the CSI measurement result, fed back by the terminal, of the carrier set, the method may further include the following actions: the base station indicates the terminal to feed back the CSI measurement result by adopting a first predetermined feedback mode; and after the operation that the base station receives the CSI measurement result, fed back by the terminal, of the carrier set, the method may further include the following actions: the base station judges whether a feedback mode adopted for the CSI measurement result fed back by the terminal is the first feedback mode or not, and if it is not the first feedback mode, the base station judges that the terminal fails to measure the carrier set.

According to another aspect of the embodiments of the disclosure, another method for measuring CSI is further provided. The method may include the following actions. A terminal receives notification information arranged to indicate the terminal to feed back a CSI measurement result of a carrier set from a base station, where the carrier set may include unlicensed carriers; and the terminal feeds back the CSI measurement result of the carrier set to the base station.

Optionally, the action of receiving, by the terminal, the notification information arranged to indicate the terminal to feed back the CSI measurement result of the carrier set from the base station may include the following actions. The terminal receives the notification information sent by the base station through at least one of a PDCCH or first high-layer RRC signaling.

Optionally, the action of receiving, by the terminal, the notification information arranged to indicate the terminal to feed back the CSI measurement result of the carrier set from the base station may include the following actions. The terminal receives first indication information sent by the base station through at least one of the PDCCH or the first high-layer RRC signaling, where the first indication information may be arranged to indicate the carrier set.

Optionally, before the action of feeding back, by the terminal, the CSI measurement result of the carrier set to the base station, the method may further include the following actions. When the terminal receives the first indication information sent by the base station through at least one of the PDCCH or the first high-layer RRC signaling, or, after the terminal receives the first indication information sent by the base station through at least one of the PDCCH or the first high-layer signaling, the terminal receives second indication information sent by the base station, where the second indication information may be arranged to indicate the unlicensed carriers in the carrier set; the terminal finds the unlicensed carriers indicated by the second indication information from the carrier set; and the terminal measures CSI of an unlicensed carrier in a measurable state in the unlicensed carriers to obtain the CSI measurement result.

Optionally, before the action of measuring, by the terminal, the CSI of the unlicensed carrier in the measurable state in the unlicensed carriers, the method may further include the following actions. The terminal determines an unlicensed carrier having sent a pilot signal in the unlicensed carriers according to third indication information sent by the base station, where the unlicensed carrier having sent the pilot signal may be the unlicensed carrier in the measurable state, where the terminal may receive the third indication information sent by the base station when receiving the first indication information sent by the base station through at least one of the PDCCH or the first high-layer RRC signaling, or, after receiving the first indication information sent by the base station through at least one of the PDCCH or the first high-layer RRC signaling.

Optionally, the action of feeding back, by the terminal, the CSI measurement result of the carrier set to the base station may include the following actions. The terminal determines that fourth indication information sent by the base station indicates whether the CSI measurement result of the carrier set is allowed to be fed back to the base station or not; if the fourth indication information indicates that the CSI measurement result of the carrier set is allowed to be fed back to the base station, the terminal feeds back the CSI measurement result of the carrier set to the base station; and if the fourth indication information indicates that the CSI measurement result of the carrier set is not allowed to be fed back to the base station, the terminal cancels feedback of the CSI measurement result of the carrier set to the base station, where the terminal may receive the fourth indication information sent by the base station when receiving the first indication information sent by the base station through at least one of the PDCCH or the first high-layer RRC signaling, or, after receiving the first indication information sent by the base station through at least one of the PDCCH or the first high-layer RRC signaling.

Optionally, the action of feeding back, by the terminal, the CSI measurement result of the carrier set to the base station may include that the following actions. The terminal receives PUSCH carrier indication information sent by the base station; the terminal acquires a specified carrier through the PUSCH carrier indication information, where the specified carrier may be at least one of a licensed carrier or an unlicensed carrier; and the terminal feeds back the CSI measurement result of the carrier set to the base station through the specified carrier.

Optionally, the action of feeding back, by the terminal, the CSI measurement result of the carrier set to the base station may include the following actions. Under the condition that the base station does not receive the CSI measurement result within a predetermined time, the terminal receives one or more licensed carriers indicated by the base station; and the terminal feeds back the CSI measurement result through the one or more licensed carriers.

Optionally, before the action of feeding back, by the terminal, the CSI measurement result of the carrier set to the base station, the method may further include the following actions. Under the condition that the specified carrier is an unlicensed carrier, the specified carrier is monitored, and it is determined that the specified carrier is in an idle state.

Optionally, during the action of feeding back, by the terminal, the CSI measurement result of the carrier set to the base station, the method may further include the following actions. The terminal sends fifth indication information to the base station, where the fifth indication information may be arranged to indicate an unlicensed carrier which has been measured and of which a CSI measurement result has been successfully fed back.

Optionally, the action of sending, by the terminal, the fifth indication information to the base station may include the following actions. The terminal sends the fifth indication information to the base station in a bitmap manner, where a length of the fifth indication information may be the same as a number of carriers in the carrier set; or, the length of the fifth indication information may be the same as a number of the unlicensed carriers in the carrier set.

Optionally, the action of feeding back, by the terminal, the CSI measurement result of the carrier set to the base station may include the following actions. Under the condition that the terminal fails to measure CSI of the carrier set, the terminal cancels feedback of any information to the base station, or, the terminal feeds back information indicating that the CSI of the carrier set is failed to be measured to the base station, or, the terminal feeds back a preset Channel Quality Indicator (CQI) value to the base station.

Optionally, the action of feeding back, by the terminal, the CSI measurement result of the carrier set to the base station may include the following actions. Under the condition that the terminal completes measurement over CSI of a first unlicensed carrier in the carrier set, the terminal feeds back a CSI measurement result of the first unlicensed carrier to the base station by adopting a first feedback mode indicated by the base station; and under the condition that the terminal fails to measure CSI of a second unlicensed carrier in the carrier set, the terminal feeds back a CSI measurement result of the second unlicensed carrier to the base station by adopting a second predetermined feedback mode different from the first feedback mode, where the second feedback mode may be arranged to indicate that the terminal fails to measure the CSI of the second unlicensed carrier.

Optionally, the carrier set may be one of: a carrier set obtained by adding the unlicensed carriers in a first carrier set only including licensed carriers or a second carrier set only including licensed carriers; and a third carrier set determined except the first carrier set only including the licensed carriers and the second carrier set only including the licensed carriers, where the third carrier set may include the unlicensed carriers.

According to an aspect of the embodiments of the disclosure, a device for measuring CSI is provided, which may be applied to a base station and include: a notification module, arranged to notify a terminal to feed back a CSI measurement result of a carrier set, where the carrier set may include unlicensed carriers; and a first receiving module, arranged to receive the CSI measurement result, fed back by the terminal, of the carrier set.

Optionally, the notification module may be arranged to notify the terminal to feed back the CSI measurement result of the carrier set through at least one of a PDCCH or first high-layer RRC signaling.

Optionally, the notification module may include: a first sending unit, arranged to send first indication information to the terminal through at least one of the PDCCH or the first high-layer RRC signaling, where the first indication information may be arranged to indicate the carrier set.

Optionally, the notification module may further include: a second sending unit, arranged to, when the first sending unit sends the first indication information to the terminal through at least one of the PDCCH or the first high-layer RRC signaling, or, after the first sending unit sends the first indication information to the terminal through at least one of the PDCCH or the first high-layer RRC signaling, send second indication information to the terminal, where the second indication information may be arranged to indicate the unlicensed carriers in the carrier set.

Optionally, the device may further include: a second receiving module, arranged to receive second high-layer RRC signaling, where an existing bit or newly added bit in the second high-layer RRC signaling may be arranged to indicate whether the carrier set includes the unlicensed carriers or not; and a generation module, arranged to generate the second indication information according to the second high-layer RRC signaling.

Optionally, the second sending unit may be arranged to send the second indication information to the terminal in a bitmap manner, where a length of the second indication information may be the same as a number of carriers in the carrier set; or, the length of the second indication information may be the same as a number of the unlicensed carriers in the carrier set.

Optionally, when the base station sends the first indication information to the terminal through at least one of the PDCCH or the first high-layer RRC signaling, under the condition that the base station sends the second indication information to the terminal, the first indication information and the second indication information may be represented by different bits in the same indication information.

Optionally, the notification module may further include: a third sending unit, arranged to, when the first sending unit sends the first indication information to the terminal through at least one of the PDCCH or the first high-layer RRC signaling, or, after the first sending unit sends the first indication information to the terminal through at least one of the PDCCH or the first high-layer RRC signaling, send third indication information to the terminal, where the third indication information may be arranged to indicate an unlicensed carrier having sent a pilot signal in the unlicensed carriers.

Optionally, when the first sending unit sends the first indication information to the terminal through at least one of the PDCCH or the first high-layer RRC signaling, under the condition that the third sending unit sends the third indication information to the terminal, the first indication information and the third indication information may be represented by different bits in the same indication information.

Optionally, the notification module may further include: a fourth sending unit, arranged to, when the first sending unit sends the first indication information to the terminal through at least one of the PDCCH or the first high-layer RRC signaling, or, after the first sending unit sends the first indication information to the terminal through at least one of the PDCCH or the first high-layer RRC signaling, send fourth indication information to the terminal, where the fourth indication information may be arranged to indicate whether the terminal is allowed to feed back the CSI measurement result of the carrier set or not.

Optionally, the fourth indication information may be represented by an existing bit or newly added bit in the PDCCH, where the fourth indication information, when being a first predetermined value, may be arranged to indicate that the terminal is allowed to feed back the CSI measurement result of the carrier set, and the fourth indication information, when being a second predetermined value, may be arranged to indicate that the terminal is not allowed to feed back the CSI measurement result of the carrier set.

Optionally, when the first sending unit sends the first indication information to the terminal through at least one of the PDCCH or the first high-layer RRC signaling, under the condition that the fourth sending unit sends the fourth indication information to the terminal, the first indication information and the fourth indication information may be represented by different bits in the same indication information.

Optionally, the device may further include: a sending module, arranged to send authorization indication information to the terminal under the condition of not receiving the CSI measurement result within a predetermined time, where the authorization indication information may be arranged to indicate the terminal to feed back the CSI measurement result on one or more licensed carriers; and a third receiving module, arranged to receive the CSI measurement result sent by the terminal on the one or more licensed carriers.

Optionally, the device may further include: a first acquisition module, arranged to add the unlicensed carriers in a first carrier set only including licensed carriers or a second carrier set only including licensed carriers to obtain the carrier set; or a second acquisition module, configured for the base station to add the unlicensed carriers in both the first carrier set only including the licensed carriers and the second carrier set only including the licensed carriers, and select the first carrier set added with the unlicensed carriers or the second carrier set added with the unlicensed carriers as the carrier set; or a third acquisition module, arranged to set a third carrier set except the first carrier set only including the licensed carriers and the second carrier set only including the licensed carriers, where the third carrier set may include the unlicensed carriers.

Optionally, the device may further include: an indication module, arranged to, before the first receiving module receives the CSI measurement result, fed back by the terminal, of the carrier set, indicate the terminal to feed back the CSI measurement result by adopting a first predetermined feedback mode; and a judgment module, arranged to, after the first receiving module receives the CSI measurement result, fed back by the terminal, of the carrier set, judge whether a feedback mode adopted for the CSI measurement result fed back by the terminal is the first feedback mode or not, and if it is not the first feedback mode, judge that the terminal fails to measure the carrier set.

According to another aspect of the embodiments of the disclosure, another device for measuring CSI is further provided, which may be applied to a terminal and include: a fourth receiving module, arranged to receive notification information arranged to indicate the terminal to feed back a CSI measurement result of a carrier set from a base station, where the carrier set may include unlicensed carriers; and a first feedback module, arranged to feed back the CSI measurement result of the carrier set to the base station.

Optionally, the fourth receiving module may be arranged to receive the notification information sent by the base station through at least one of a PDCCH or first high-layer RRC signaling.

Optionally, the fourth receiving module may be arranged to receive first indication information sent by the base station through at least one of the PDCCH or the first high-layer RRC signaling, where the first indication information may be arranged to indicate the carrier set.

Optionally, the device may further include: a fifth receiving module, arranged to, before the first feedback module feeds back the CSI measurement result of the carrier set to the base station, when the terminal receives the first indication information sent by the base station through at least one of the PDCCH or the first high-layer RRC signaling, or, after the terminal receives the first indication information sent by the base station through at least one of the PDCCH or the first high-layer signaling, receive second indication information sent by the base station, where the second indication information may be arranged to indicate the unlicensed carriers in the carrier set; a searching module, arranged to find the unlicensed carriers indicated by the second indication information from the carrier set; and a measurement module, arranged to measure CSI of an unlicensed carrier in a measurable state in the unlicensed carriers to obtain the CSI measurement result.

Optionally, the device may further include: a sixth receiving module, arranged to, before the fourth receiving module receives the first indication information sent by the base station through at least one of the PDCCH or the first high-layer RRC signaling, or, after the first indication information sent by the base station is received through at least one of the PDCCH or the first high-layer RRC signaling, receive third indication information sent by the base station; and a first determination module, arranged to, before the measurement module measures the CSI of the unlicensed carrier in the measurable state in the unlicensed carriers, determine an unlicensed carrier having sent a pilot signal in the unlicensed carriers according to the third indication information sent by the base station, where the unlicensed carrier having sent the pilot signal may be the unlicensed carrier in the measurable state.

Optionally, the device may further include: a seventh receiving module, arranged to, when the first indication information sent by the base station is received through at least one of the PDCCH or the first high-layer RRC signaling, or, after the first indication information sent by the base station through at least one of the PDCCH or the first high-layer RRC signaling, receive fourth indication information sent by the base station; and a second determination module, arranged to determine that the fourth indication information sent by the base station indicates whether the CSI measurement result of the carrier set is allowed to be fed back to the base station or not, if the fourth indication information indicates that the CSI measurement result of the carrier set is allowed to be fed back to the base station, feed back the CSI measurement result of the carrier set to the base station, and if the fourth indication information indicates that the CSI measurement result of the carrier set is not allowed to be fed back to the base station, cancel feedback of the CSI measurement result of the carrier set to the base station.

Optionally, the first feedback module may include: a receiving unit, arranged to receive PUSCH carrier indication information sent by the base station; an acquisition unit, arranged to acquire a specified carrier through the PUSCH carrier indication information, where the specified carrier may be at least one of a licensed carrier or an unlicensed carrier; and a feedback unit, arranged to feed back the CSI measurement result of the carrier set to the base station through the specified carrier.

Optionally, the device may further include: an eighth receiving module, arranged to, under the condition that the base station does not receive the CSI measurement result within a predetermined time, receive one or more licensed carriers indicated by the base station; and a second feedback module, arranged to feed back the CSI measurement result through the one or more licensed carriers.

Optionally, the device may further include: a monitoring module, arranged to, before the first feedback module feeds back the CSI measurement result of the carrier set to the base station, under the condition that the specified carrier is an unlicensed carrier, monitor the specified carrier, and determine that the specified carrier is in an idle state.

Optionally, the device may further include: a third feedback module, arranged to send fifth indication information to the base station, where the fifth indication information may be arranged to indicate an unlicensed carrier which has been measured and of which a CSI measurement result has been successfully fed back.

Optionally, the third feedback module may be arranged to send the fifth indication information to the base station in a bitmap manner, where a length of the fifth indication information may be the same as a number of carriers in the carrier set; or, the length of the fifth indication information may be the same as a number of the unlicensed carriers in the carrier set.

Optionally, the first feedback module may be arranged to, under the condition that the terminal fails to measure CSI of the carrier set, cancel feedback of any information to the base station, or, feed back information indicating that the CSI of the carrier set is failed to be measured to the base station, or, feed back a preset CQI value to the base station.

Optionally, the first feedback module may be arranged to, under the condition that the terminal completes measurement over CSI of the unlicensed carriers, feed back the CSI measurement result of the carrier set to the base station by adopting a first feedback mode indicated by the base station, and under the condition that the terminal fails to measure the CSI of the unlicensed carriers, feed back the CSI measurement result of the carrier set to the base station by adopting a second predetermined feedback mode different from the first feedback mode, where the second feedback mode may be arranged to indicate that the terminal fails to measure the CSI of the unlicensed carriers.

Optionally, the carrier set may be one of: a carrier set obtained by adding the unlicensed carriers in a first carrier set only including licensed carriers or a second carrier set only including licensed carriers; and a third carrier set determined except the first carrier set only including the licensed carriers and the second carrier set only including the licensed carriers, where the third carrier set may include the unlicensed carriers.

According to another aspect of the embodiments of the disclosure, a computer-readable storage medium is further provided, which may store a computer-executable instruction, the computer-executable instruction being executed by a processor to implement the method.

According to the embodiments of the disclosure, the base station notifies the terminal to feed back the CSI measurement result of the carrier set, where the carrier set includes the unlicensed carriers; and the base station receives the CSI measurement, fed back by the terminal, of the carrier set. The technical problem that CSI of an unlicensed carrier fails to be measured in the related technology is solved, and the technical effect that the base station may acquire the CSI measurement result, measured by the terminal, of the unlicensed carriers is further achieved.

After the drawings and detailed descriptions are read and understood, the other aspects may be comprehended.

DETAILED DESCRIPTION

Implementation modes of the disclosure will be described below with reference to the drawings and in combination with the embodiments in detail. It is important to note that the embodiments in the application and characteristics in the embodiments may be combined without conflicts.

It is important to note that terms "first", "second" and the like in the specification, claims and drawings of the application are adopted not to describe a specific sequence or order but to distinguish similar objects.

Figure 1:
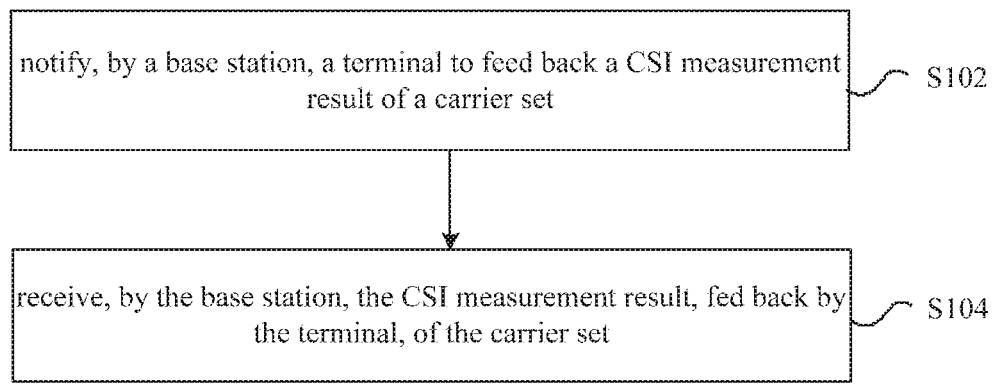
FIG. 1 is a flowchart of a method for measuring CSI according to an embodiment of the disclosure.

An embodiment provides a method for measuring CSI. FIG. 1 is a flowchart of a method for measuring CSI according to an embodiment of the disclosure. As shown in FIG. 1, the flow includes the following steps.

In Step S102, a base station notifies a terminal to feed back a CSI measurement result of a carrier set, where the carrier set includes unlicensed carriers.

In Step S104, the base station receives the CSI measurement result, fed back by the terminal, of the carrier set.

By the steps, the base station notifies the terminal to feed back the CSI measurement result of the carrier set, then the terminal may measure CSI of the carrier set, and the base station may regulate a carrier used by the terminal according to the CSI measurement result, fed back by the terminal, of the carrier set, where the carrier set includes the unlicensed carriers, that is, the carrier set may be a set of the unlicensed carriers, and may also be a set of the unlicensed carriers and licensed carriers. Compared with the related technology, for these conditions probably occurring on an unlicensed carrier that CSI fails to be measured, a PUSCH fails to be sent due to a failure in contention for a channel and the like, the steps solve the technical problem that the CSI of the unlicensed carrier fails to be measured in the related technology, and further achieve the technical effect that the base station may acquire the CSI measurement result, measured by the terminal, of the unlicensed carriers.

The operation that the base station notifies the terminal to feed back the CSI measurement result of the carrier set is involved in Step S102. In an optional embodiment, the base station notifies the terminal to feed back the CSI measurement result of the carrier set through at least one of a PDCCH or first high-layer RRC signaling.

The operation that the base station notifies the terminal to feed back the CSI measurement result of the carrier set is involved in Step S102. In an optional embodiment, the base station sends first indication information to the terminal through at least one of the PDCCH or the first high-layer RRC signaling, where the first indication information is arranged to indicate the carrier set.

In a process where the terminal is required to measure CSI of the unlicensed carriers, when the base station sends the first indication information to the terminal through at least one of the PDCCH or the first high-layer RRC signaling, or, after the base station sends the first indication information to the terminal through at least one of the PDCCH or the first high-layer RRC signaling, the base station sends second indication information to the terminal, where the second indication information is arranged to indicate the unlicensed carriers in the carrier set. Therefore, the terminal may measure the unlicensed carriers in the carrier set.

There may be multiple generation methods for the second indication information, which will be described below with an example. In an optional embodiment, before the base station sends the second indication information to the terminal, the base station generates second high-layer RRC signaling, where an existing bit or newly added bit in the second high-layer RRC signaling is arranged to indicate whether the carrier set includes the unlicensed carriers or not; and the base station generates the second indication information according to the second high-layer RRC signaling.

The base station may send the second indication information to the terminal in multiple manners. In an optional embodiment, the base station sends the second indication information to the terminal in a bitmap manner, where a length of the second indication information is the same as a number of carriers in the carrier set; or, the length of the second indication information is the same as a number of the unlicensed carriers in the carrier set.

In an optional embodiment, when the base station sends the first indication information to the terminal through at least one of the PDCCH or the first high-layer RRC signaling, under the condition that the base station sends the second indication information to the terminal, the first indication information and the second indication information are represented by different bits in the same indication information. That is, the base station may send information including the first indication information and the second indication information to the terminal. For example, the information is represented by 01101100, the first 4 bits represent the first indication information, and the last 4 bits represent the second indication information.

Not CSI of all the unlicensed carriers in the carrier set may be measured by the terminal, so that it is necessary to further screen the unlicensed carriers. In an optional embodiment, when the base station sends the first indication information to the terminal through at least one of the PDCCH or the first high-layer RRC signaling, or, after the base station sends the first indication information to the terminal through at least one of the PDCCH or the first high-layer RRC signaling, the base station sends third indication information to the terminal, where the third indication information is arranged to indicate an unlicensed carrier having sent a pilot signal in the unlicensed carriers.

In an optional embodiment, when the base station sends the first indication information to the terminal through at least one of the PDCCH or the first high-layer RRC signaling, under the condition that the base station sends the third indication information to the terminal, the first indication information and the third indication information are represented by different bits in the same indication information. That is, the base station may send the first indication information and the third indication information to the terminal at the same time.

The base station may allow the terminal to feed back the CSI measurement result of the carrier set, and may also not allow the terminal to feed back the CSI measurement result of the carrier set. Therefore, in an optional embodiment, when the base station sends the first indication information to the terminal through at least one of the PDCCH or the first high-layer RRC signaling, or, after the base station sends the first indication information to the terminal through at least one of the PDCCH or the first high-layer RRC signaling, the base station sends fourth indication information to the terminal, where the fourth indication information is arranged to indicate whether the terminal is allowed to feed back the CSI measurement result of the carrier set or not.

In an optional embodiment, the fourth indication information is represented by an existing bit or newly added bit in the PDCCH, where the fourth indication information, when being a first predetermined value, is arranged to indicate that the terminal is allowed to feed back the CSI measurement result of the carrier set, and the fourth indication information, when being a second predetermined value, is arranged to indicate that the terminal is not allowed to feed back the CSI measurement result of the carrier set.

In an optional embodiment, when the base station sends the first indication information to the terminal through at least one of the PDCCH or the first high-layer RRC signaling, under the condition that the base station sends the fourth indication information to the terminal, the first indication information and the fourth indication information are represented by different bits in the same indication information.

The base station may receive the CSI measurement result sent by the terminal, and may also not receive the CSI measurement result. In an optional embodiment, the base station sends authorization indication information to the terminal under the condition of not receiving the CSI measurement result within a predetermined time, where the authorization indication information is arranged to indicate the terminal to feed back the CSI measurement result on one or more licensed carriers, and the base station receives the CSI measurement result sent by the terminal on the one or more licensed carriers.

In an optional embodiment, before the base station notifies the terminal to feed back the CSI measurement result of the carrier set, the base station adds the unlicensed carriers in a first carrier set only including licensed carriers or a second carrier set only including licensed carriers to obtain the carrier set; the base station adds the unlicensed carriers in both the first carrier set only including the licensed carriers and the second carrier set only including the licensed carriers, and selects the first carrier set added with the unlicensed carriers or the second carrier set added with the unlicensed carriers as the carrier set; and the base station sets a third carrier set except the first carrier set only including the licensed carriers and the second carrier set only including the licensed carriers, where the third carrier set includes the unlicensed carriers.

In an optional embodiment, before the base station receives the CSI measurement result, fed back by the terminal, of the carrier set, the base station indicates the terminal to feed back the CSI measurement result by adopting a first predetermined feedback mode; and after the operation that the base station receives the CSI measurement result, fed back by the terminal, of the carrier set, the method further includes that: the base station judges whether a feedback mode adopted for the CSI measurement result fed back by the terminal is the first feedback mode or not, and if it is not the first feedback mode, the base station judges that the terminal fails to measure the carrier set.

From the descriptions about the above implementation mode, those skilled in the art may clearly know that the method according to the embodiment may be implemented by virtue of a manner of combining software and a necessary universal hardware platform, and of course, may also be implemented through hardware, but the former is a preferred implementation mode under many circumstances. Based on such an understanding, the technical solution of the embodiment of the disclosure may be embodied in form of software product, and the computer software product is stored in a storage medium (for example, a Read-Only Memory (ROM)/Random Access Memory (RAM), a magnetic disk and an optical disk), including multiple instructions arranged to enable a piece of terminal equipment (which may be a mobile phone, a computer, a server, network equipment or the like) to execute the method of the embodiment of the disclosure.

The embodiment further provides a device for measuring CSI. The device is arranged to implement the abovementioned embodiment and optional implementation modes, and what has been described will not be elaborated. For example, term "module", used below, may be a combination of software and, hardware software and/or hardware capable of realizing a preset function. Although the device described in the following embodiment is preferably implemented with software, implementation with hardware or a combination of the software and the hardware is also possible and conceivable.

Figure 2:
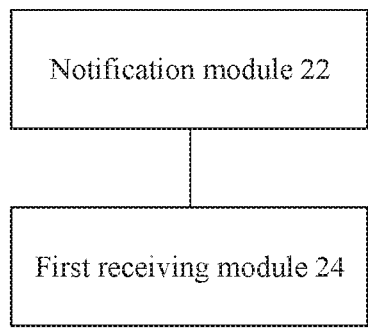
FIG. 2 is a structure block diagram of a device for measuring CSI according to an embodiment of the disclosure.

FIG. 2 is a structure block diagram of a device for measuring CSI according to an embodiment of the disclosure. The device is applied to a base station, and as shown in FIG. 2, includes: a notification module 22, arranged to notify a terminal to feed back a CSI measurement result of a carrier set, where the carrier set includes unlicensed carriers; and a first receiving module 24, arranged to receive the CSI measurement result, fed back by the terminal, of the carrier set.

Optionally, the notification module 22 is arranged to notify the terminal to feed back the CSI measurement result of the carrier set through at least one of a PDCCH or first high-layer RRC signaling.

Figure 3:
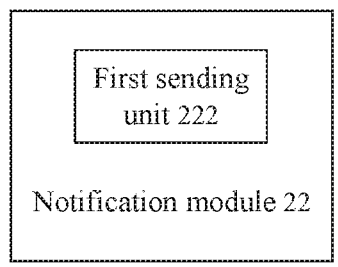
FIG. 3 is another structure block diagram of a device for measuring CSI according to an embodiment of the disclosure.

FIG. 3 is another structure block diagram of a device for measuring CSI according to an embodiment of the disclosure. As shown in FIG. 3, the notification module 22 includes: a first sending unit 222, arranged to send first indication information to the terminal through at least one of the PDCCH or the first high-layer RRC signaling, where the first indication information is arranged to indicate the carrier set.

Figure 4:
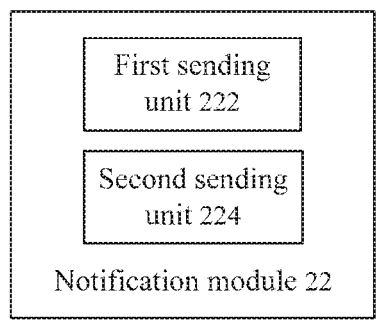
FIG. 4 is another structure block diagram of a device for measuring CSI according to an embodiment of the disclosure.

FIG. 4 is another structure block diagram of a device for measuring CSI according to an embodiment of the disclosure. As shown in FIG. 4, the notification module 22 further includes: a second sending unit 224, arranged to, when the first sending unit sends the first indication information to the terminal through at least one of the PDCCH or the first high-layer RRC signaling, or, after the first sending unit 222 sends the first indication information to the terminal through at least one of the PDCCH or the first high-layer RRC signaling, send second indication information to the terminal, where the second indication information is arranged to indicate the unlicensed carriers in the carrier set.

Figure 5:
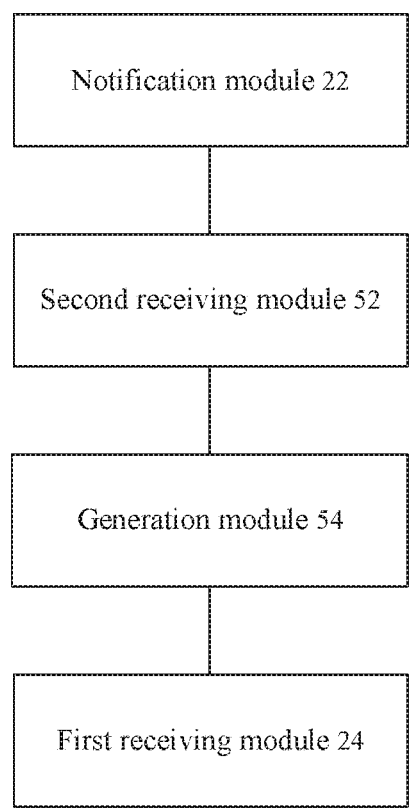
FIG. 5 is another structure block diagram of a device for measuring CSI according to an embodiment of the disclosure.

FIG. 5 is another structure block diagram of a device for measuring CSI according to an embodiment of the disclosure. As shown in FIG. 5, the device further includes: a second receiving module 52, arranged to receive second high-layer RRC signaling, where an existing bit or newly added bit in the second high-layer RRC signaling is arranged to indicate whether the carrier set includes the unlicensed carriers or not; and a generation module 54, arranged to generate the second indication information according to the second high-layer RRC signaling.

Optionally, the second sending unit 224 is arranged to send the second indication information to the terminal in a bitmap manner, where a length of the second indication information is the same as a number of carriers in the carrier set; or, the length of the second indication information is the same as a number of the unlicensed carriers in the carrier set.

Optionally, when the base station sends the first indication information to the terminal through at least one of the PDCCH or the first high-layer RRC signaling, under the condition that the base station sends the second indication information to the terminal, the first indication information and the second indication information are represented by different bits in the same indication information.

Figure 6:
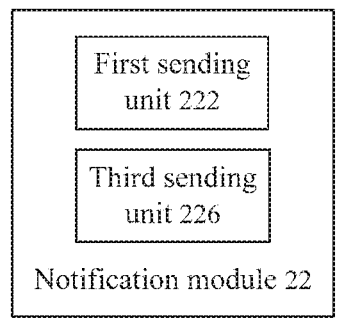
FIG. 6 is another structure block diagram of a device for measuring CSI according to an embodiment of the disclosure.

FIG. 6 is another structure block diagram of a device for measuring CSI according to an embodiment of the disclosure. As shown in FIG. 6, the notification module 22 further includes: a third sending unit 226, arranged to, when the first sending unit 222 sends the first indication information to the terminal through at least one of the PDCCH or the first high-layer RRC signaling, or, after the first sending unit 222 sends the first indication information to the terminal through at least one of the PDCCH or the first high-layer RRC signaling, send third indication information to the terminal, where the third indication information is arranged to indicate an unlicensed carrier having sent a pilot signal in the unlicensed carriers.

Optionally, when the first sending unit 222 sends the first indication information to the terminal through at least one of the PDCCH or the first high-layer RRC signaling, under the condition that the third sending unit 226 sends the third indication information to the terminal, the first indication information and the third indication information are represented by different bits in the same indication information.

Figure 7:
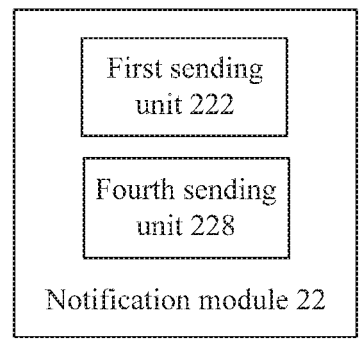
FIG. 7 is another structure block diagram of a device for measuring CSI according to an embodiment of the disclosure.

FIG. 7 is another structure block diagram of a device for measuring CSI according to an embodiment of the disclosure. As shown in FIG. 7, the notification module 22 further includes: a fourth sending unit 228, arranged to, when the first sending unit 222 sends the first indication information to the terminal through at least one of the PDCCH or the first high-layer RRC signaling, or, after the first sending unit 222 sends the first indication information to the terminal through at least one of the PDCCH or the first high-layer RRC signaling, send fourth indication information to the terminal, where the fourth indication information is arranged to indicate whether the terminal is allowed to feed back the CSI measurement result of the carrier set or not.

Optionally, the fourth indication information is represented by an existing bit or newly added bit in the PDCCH, where the fourth indication information, when being a first predetermined value, is arranged to indicate that the terminal is allowed to feed back the CSI measurement result of the carrier set, and the fourth indication information, when being a second predetermined value, is arranged to indicate that the terminal is not allowed to feed back the CSI measurement result of the carrier set.

Optionally, when the first sending unit 222 sends the first indication information to the terminal through at least one of the PDCCH or the first high-layer RRC signaling, under the condition that the fourth sending unit 228 sends the fourth indication information to the terminal, the first indication information and the fourth indication information are represented by different bits in the same indication information.

Figure 8:
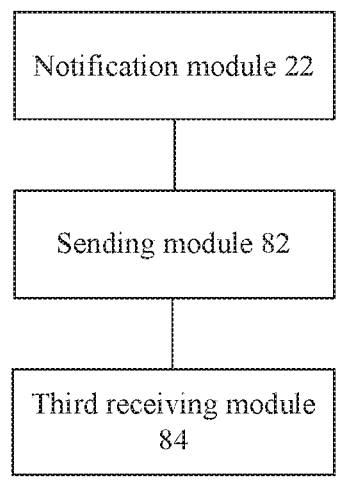
FIG. 8 is another structure block diagram of a device for measuring CSI according to an embodiment of the disclosure.

FIG. 8 is another structure block diagram of a device for measuring CSI according to an embodiment of the disclosure. As shown in FIG. 8, the device further includes: a sending module 82, arranged to send authorization indication information to the terminal under the condition of not receiving the CSI measurement result within a predetermined time, where the authorization indication information is arranged to indicate the terminal to feed back the CSI measurement result on one or more licensed carriers; and a third receiving module 84, arranged to receive the CSI measurement result sent by the terminal on the one or more licensed carriers.

Figure 9:
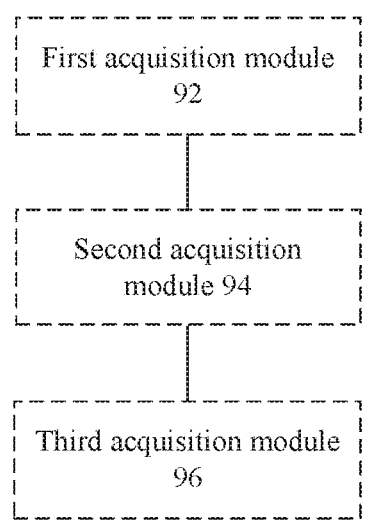
FIG. 9 is another structure block diagram of a device for measuring CSI according to an embodiment of the disclosure.

FIG. 9 is another structure block diagram of a device for measuring CSI according to an embodiment of the disclosure. As shown in FIG. 9, the device further includes: a first acquisition module 92, arranged to add the unlicensed carriers in a first carrier set only including licensed carriers or a second carrier set only including licensed carriers to obtain the carrier set; or a second acquisition module 94, configured for the base station to add the unlicensed carriers in both the first carrier set only including the licensed carriers and the second carrier set only including the licensed carriers, and select the first carrier set added with the unlicensed carriers or the second carrier set added with the unlicensed carriers as the carrier set; or a third acquisition module 96, arranged to set a third carrier set except the first carrier set only including the licensed carriers and the second carrier set only including the licensed carriers, where the third carrier set includes the unlicensed carriers.

Figure 10:
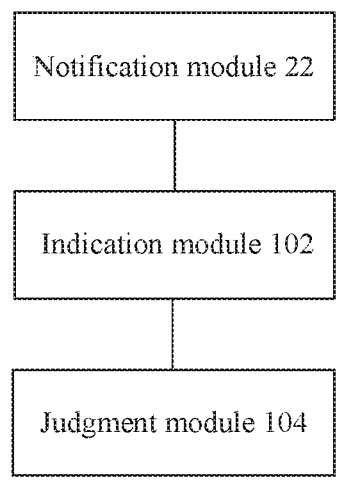
FIG. 10 is another structure block diagram of a device for measuring CSI according to an embodiment of the disclosure.

FIG. 10 is another structure block diagram of a device for measuring CSI according to an embodiment of the disclosure. As shown in FIG. 10, the device further includes: an indication module 102, arranged to, before the first receiving module receives the CSI measurement result, fed back by the terminal, of the carrier set, indicate the terminal to feed back the CSI measurement result by adopting a first predetermined feedback mode; and a judgment module 104, arranged to, after the first receiving module receives the CSI measurement result, fed back by the terminal, of the carrier set, judge whether a feedback mode adopted for the CSI measurement result fed back by the terminal is the first feedback mode or not, and if it is not the first feedback mode, judge that the terminal fails to measure the carrier set.

It is important to note that the modules may be implemented through software or hardware, and the latter condition may be implemented in, but not limited to, the following manners: the modules are all located in the same processors, or, the modules are located in multiple processors respectively.

Figure 11:
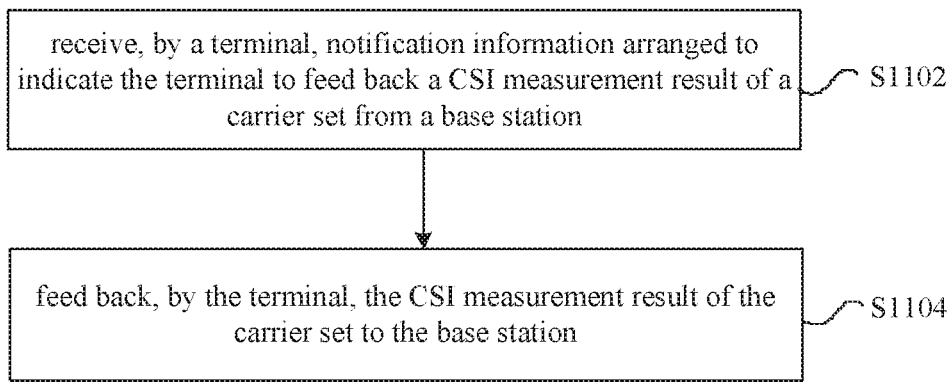
FIG. 11 is another flowchart of a method for measuring CSI according to an embodiment of the disclosure.

Another embodiment provides another method for measuring CSI. FIG. 11 is another flowchart of a method for measuring CSI according to an embodiment of the disclosure. As shown in FIG. 11, the flow includes the following steps.

In Step S1102, a terminal receives notification information arranged to indicate the terminal to feed back a CSI measurement result of a carrier set from a base station, where the carrier set includes unlicensed carriers.

In Step S1104, the terminal feeds back the CSI measurement result of the carrier set to the base station.

By the steps, the terminal receives the notification information arranged to indicate the terminal to feed back the CSI measurement result of the carrier set from the base station, then the terminal may measure CSI of the carrier set, and the base station may regulate a carrier used by the terminal according to the CSI measurement result, fed back by the terminal, of the carrier set, where the carrier set includes the unlicensed carriers, that is, the carrier set may be a set of the unlicensed carriers, and may also be a set of the unlicensed carriers and licensed carriers. Compared with the related technology, for these conditions probably occurring on an unlicensed carrier that CSI fails to be measured, a PUSCH fails to be sent due to a failure in contention for a channel and the like, the steps solve the problem on the unlicensed carrier that the CSI fails to be measured or the PUSCH fails to be sent due to the failure in contention for the channel in the related technology, and further implement measurement of the terminal over the CSI of the unlicensed carrier and acquisition of the base station over the CSI measurement result of the unlicensed carrier.

The operation that the terminal receives the notification information arranged to indicate the terminal to feed back the CSI measurement result of the carrier set from the base station is involved in Step S1102. In an optional embodiment, the terminal receives the notification information sent by the base station through at least one of a PDCCH or first high-layer RRC signaling.

The operation that the terminal receives the notification information arranged to indicate the terminal to feed back the CSI measurement result of the carrier set from the base station is involved in Step S1102. In an optional embodiment, the terminal receives first indication information sent by the base station through at least one of the PDCCH or the first high-layer RRC signaling, where the first indication information is arranged to indicate the carrier set.

In an optional embodiment, before the terminal feeds back the CSI measurement result of the carrier set to the base station, when the terminal receives the first indication information sent by the base station through at least one of the PDCCH or the first high-layer RRC signaling, or, after the terminal receives the first indication information sent by the base station through at least one of the PDCCH or the first high-layer signaling, the terminal receives second indication information sent by the base station, where the second indication information is arranged to indicate the unlicensed carriers in the carrier set; the terminal finds the unlicensed carriers indicated by the second indication information from the carrier set; and the terminal measures CSI of an unlicensed carrier in a measurable state in the unlicensed carriers to obtain the CSI measurement result.

Not CSI of all the unlicensed carriers in the carrier set may be measured by the terminal, so that it is necessary to further screen the unlicensed carriers. In an optional embodiment, before the terminal measures the CSI of the unlicensed carrier in the measurable state in the unlicensed carriers, the terminal determines an unlicensed carrier having sent a pilot signal in the unlicensed carriers according to third indication information sent by the base station, where the unlicensed carrier having sent the pilot signal is the unlicensed carrier in the measurable state, where the terminal receives the third indication information sent by the base station when receiving the first indication information sent by the base station through at least one of the PDCCH or the first high-layer RRC signaling, or, after receiving the first indication information sent by the base station through at least one of the PDCCH or the first high-layer RRC signaling.

The base station may allow the terminal to feed back the CSI measurement result of the carrier set, and may also not allow the terminal to feed back the CSI measurement result of the carrier set. Therefore, in an optional embodiment, the operation that the terminal feeds back the CSI measurement result of the carrier set to the base station includes that: the terminal determines that fourth indication information sent by the base station indicates whether the CSI measurement result of the carrier set is allowed to be fed back to the base station or not; if the fourth indication information indicates that the CSI measurement result of the carrier set is allowed to be fed back to the base station, the terminal feeds back the CSI measurement result of the carrier set to the base station; and if the fourth indication information indicates that the CSI measurement result of the carrier set is not allowed to be fed back to the base station, the terminal cancels feedback of the CSI measurement result of the carrier set to the base station, where the terminal receives the fourth indication information sent by the base station when receiving the first indication information sent by the base station through at least one of the PDCCH or the first high-layer RRC signaling, or, after receiving the first indication information sent by the base station through at least one of the PDCCH or the first high-layer RRC signaling.

The operation that the terminal feeds back the CSI measurement result of the carrier set to the base station is involved in Step S1104. In an optional embodiment, the terminal receives PUSCH carrier indication information sent by the base station; the terminal acquires a specified carrier through the PUSCH carrier indication information, where the specified carrier is at least one of a licensed carrier or an unlicensed carrier; and the terminal feeds back the CSI measurement result of the carrier set to the base station through the specified carrier.

The operation that the terminal feeds back the CSI measurement result of the carrier set to the base station is involved in Step S1104. In an optional embodiment, under the condition that the base station does not receive the CSI measurement result within a predetermined time, the terminal receives one or more licensed carriers indicated by the base station, and the terminal feeds back the CSI measurement result through the one or more licensed carriers.

When the CSI measurement result of the carrier set is required to be fed back through the unlicensed carriers, in an optional embodiment, optionally, before the operation that the terminal feeds back the CSI measurement result of the carrier set to the base station, the method further includes that: under the condition that the specified carrier is an unlicensed carrier, the specified carrier is monitored, and it is determined that the specified carrier is in an idle state.

The operation that the terminal feeds back the CSI measurement result of the carrier set to the base station is involved in Step S1104. In an optional embodiment, the terminal sends fifth indication information to the base station, where the fifth indication information is arranged to indicate an unlicensed carrier which has been measured and of which a CSI measurement result has been successfully fed back.

In an optional embodiment, the terminal sends the fifth indication information to the base station in a bitmap manner, where a length of the fifth indication information is the same as a number of carriers in the carrier set; or, the length of the fifth indication information is the same as a number of the unlicensed carriers in the carrier set.

The operation that the terminal feeds back the CSI measurement result of the carrier set to the base station is involved in Step S1104. In an optional embodiment, under the condition that the terminal fails to measure CSI of the carrier set, the terminal cancels feedback of any information to the base station, or, the terminal feeds back information indicating that the CSI of the carrier set is failed to be measured to the base station, or, the terminal feeds back a preset CQI value to the base station.

The operation that the terminal feeds back the CSI measurement result of the carrier set to the base station is involved in Step S1104. Under the condition that the terminal completes measurement over CSI of a first unlicensed carrier in the carrier set, the terminal feeds back a CSI measurement result of the first unlicensed carrier to the base station by adopting a first feedback mode indicated by the base station; and under the condition that the terminal fails to measure CSI of a second unlicensed carrier in the carrier set, the terminal feeds back a CSI measurement result of the second unlicensed carrier to the base station by adopting a second predetermined feedback mode different from the first feedback mode, where the second feedback mode is arranged to indicate that the terminal fails to measure the CSI of the second unlicensed carrier. For example, the first feed back module is a mode 2-1, that is, information required to be fed back to the base station by the terminal includes: a wideband CQI, one or more recommended sub-band CQIs and a wideband Precoding Matrix Indicator (PMI)/Rank Indicator (RI); and information required to be fed back to the base station by the terminal in the second feedback mode includes: the wideband CQI.

In an optional embodiment, the carrier set is one of: a carrier set obtained by adding the unlicensed carriers in a first carrier set only including licensed carriers or a second carrier set only including licensed carriers; and a third carrier set determined except the first carrier set only including the licensed carriers and the second carrier set only including the licensed carriers, where the third carrier set includes the unlicensed carriers.

From the descriptions about the above implementation mode, those skilled in the art may clearly know that the method according to the embodiment may be implemented by virtue of a manner of combining software and a necessary universal hardware platform, and of course, may also be implemented through hardware, but the former is a preferred implementation mode under many circumstances. Based on such an understanding, the technical solution of the embodiment of the disclosure may be embodied in form of software product, and the computer software product is stored in a storage medium (for example, a ROM/RAM, a magnetic disk and an optical disk), including multiple instructions arranged to enable a piece of terminal equipment (which may be a mobile phone, a computer, a server, network equipment or the like) to execute the method of the embodiment of the disclosure.

The embodiment further provides another device for measuring CSI. The device is arranged to implement the abovementioned embodiment and optional implementation modes, and what has been described will not be elaborated. For example, term "module", used below, may be a combination of software and/or hardware software and/or hardware capable of realizing a preset function.

Although the device described in the following embodiment is preferably implemented with software, implementation with hardware or a combination of the software and the hardware is also possible and conceivable.

Figure 12:
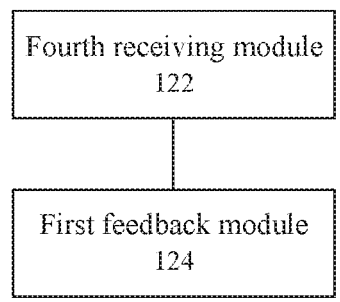
FIG. 12 is another structure block diagram of a device for measuring CSI according to an embodiment of the disclosure.

FIG. 12 is another structure block of a device for measuring CSI according to an embodiment of the disclosure. The device is applied to a terminal, and as shown in FIG. 12, includes: a fourth receiving module 122, arranged to receive notification information arranged to indicate the terminal to feed back a CSI measurement result of a carrier set from a base station, where the carrier set includes unlicensed carriers, and a first feedback module 124, arranged to feed back the CSI measurement result of the carrier set to the base station.

Optionally, the fourth receiving module 122 is arranged to receive the notification information sent by the base station through at least one of a PDCCH or first high-layer RRC signaling.

Optionally, the fourth receiving module 122 is arranged to receive first indication information sent by the base station through at least one of the PDCCH or the first high-layer RRC signaling, where the first indication information is arranged to indicate the carrier set.

Figure 13:
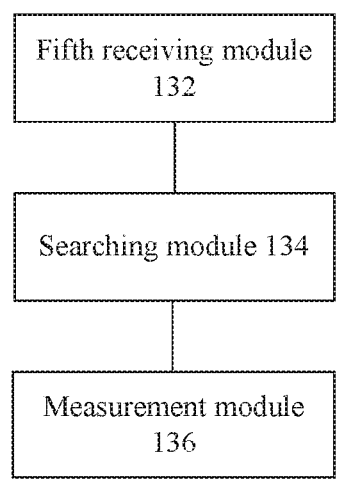
FIG. 13 is another structure block diagram of a device for measuring CSI according to an embodiment of the disclosure.

FIG. 13 is another structure block of a device for measuring CSI according to an embodiment of the disclosure. As shown in FIG. 13, the device further includes: a fifth receiving module 132, arranged to, before the first feedback module 124 feeds back the CSI measurement result of the carrier set to the base station, when the terminal receives the first indication information sent by the base station through at least one of the PDCCH or the first high-layer RRC signaling, or, after the terminal receives the first indication information sent by the base station through at least one of the PDCCH or the first high-layer signaling, receive second indication information sent by the base station, where the second indication information is arranged to indicate the unlicensed carriers in the carrier set; a searching module 134, arranged to find the unlicensed carriers indicated by the second indication information from the carrier set; and a measurement module 136, arranged to measure CSI of an unlicensed carrier in a measurable state in the unlicensed carriers to obtain the CSI measurement result.

Figure 14:
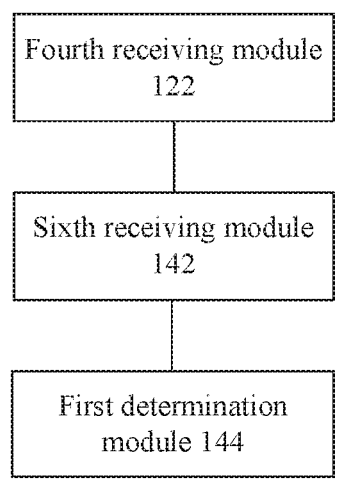
FIG. 14 is another structure block diagram of a device for measuring CSI according to an embodiment of the disclosure.

FIG. 14 is another structure block of a device for measuring CSI according to an embodiment of the disclosure. As shown in FIG. 14, the device further includes: a sixth receiving module 142, arranged to, before the fourth receiving module receives the first indication information sent by the base station through at least one of the PDCCH or the first high-layer RRC signaling, or, after the first indication information sent by the base station is received through at least one of the PDCCH or the first high-layer RRC signaling, receive third indication information sent by the base station; and a first determination module 144, arranged to, before the measurement module 136 measures the CSI of the unlicensed carrier in the measurable state in the unlicensed carriers, determine an unlicensed carrier having sent a pilot signal in the unlicensed carriers according to the third indication information sent by the base station, where the unlicensed carrier having sent the pilot signal is the unlicensed carrier in the measurable state.

Figure 15:
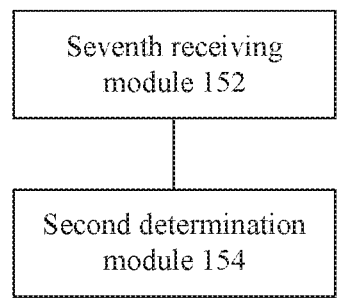
FIG. 15 is another structure block diagram of a device for measuring CSI according to an embodiment of the disclosure.

FIG. 15 is another structure block of a device for measuring CSI according to an embodiment of the disclosure. As shown in FIG. 15, the device further includes: a seventh receiving module 152, arranged to, when the first indication information sent by the base station is received through at least one of the PDCCH or the first high-layer RRC signaling, or, after the first indication information sent by the base station through at least one of the PDCCH or the first high-layer RRC signaling, receive fourth indication information sent by the base station; and a second determination module 154, arranged to determine that the fourth indication information sent by the base station indicates whether the CSI measurement result of the carrier set is allowed to be fed back to the base station or not, if the fourth indication information indicates that the CSI measurement result of the carrier set is allowed to be fed back to the base station, feed back the CSI measurement result of the carrier set to the base station, and if the fourth indication information indicates that the CSI measurement result of the carrier set is not allowed to be fed back to the base station, cancel feedback of the CSI measurement result of the carrier set to the base station.

Figure 16:
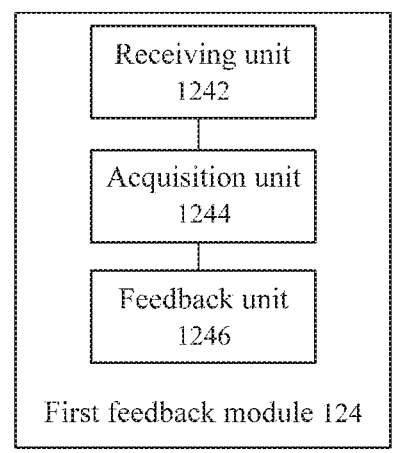
FIG. 16 is another structure block diagram of a device for measuring CSI according to an embodiment of the disclosure.

FIG. 16 is another structure block of a device for measuring CSI according to an embodiment of the disclosure. As shown in FIG. 16, the first feedback module 124 includes: a receiving unit 1242, arranged to receive PUSCH carrier indication information sent by the base station; an acquisition unit 1244, arranged to acquire a specified carrier through the PUSCH carrier indication information, where the specified carrier is at least one of a licensed carrier or an unlicensed carrier; and a feedback unit 1246, arranged to feed back the CSI measurement result of the carrier set to the base station through the specified carrier.

Optionally, the device further includes: an eighth receiving module, arranged to, under the condition that the base station does not receive the CSI measurement result within a predetermined time, receive one or more licensed carriers indicated by the base station; and a second feedback module, arranged to feed back the CSI measurement result through the one or more licensed carriers.

Optionally, the device further includes: a monitoring module, arranged to, before the first feedback module 124 feeds back the CSI measurement result of the carrier set to the base station, under the condition that the specified carrier is an unlicensed carrier, monitor the specified carrier, and determine that the specified carrier is in an idle state.

Optionally, the device further includes: a third feedback module, arranged to send fifth indication information to the base station, where the fifth indication information is arranged to indicate an unlicensed carrier which has been measured and of which a CSI measurement result has been successfully fed back.

Optionally, the third feedback module is arranged to send the fifth indication information to the base station in a bitmap manner, where a length of the fifth indication information is the same as a number of carriers in the carrier set; or, the length of the fifth indication information is the same as a number of the unlicensed carriers in the carrier set.

Optionally, the first feedback module is arranged to, under the condition that the terminal fails to measure CSI of the carrier set, cancel feedback of any information to the base station, or, feed back information indicating that the CSI of the carrier set is failed to be measured to the base station, or, feed back a preset CQI value to the base station.

Optionally, the first feedback module is arranged to, under the condition that the terminal completes measurement over CSI of the unlicensed carriers, feed back the CSI measurement result of the carrier set to the base station by adopting a first feedback mode indicated by the base station, and under the condition that the terminal fails to measure the CSI of the unlicensed carriers, feed back the CSI measurement result of the carrier set to the base station by adopting a second predetermined feedback mode different from the first feedback mode, where the second feedback mode is arranged to indicate that the terminal fails to measure the CSI of the unlicensed carriers.

Optionally, the carrier set is one of: a carrier set obtained by adding the unlicensed carriers in a first carrier set only including licensed carriers or a second carrier set only including licensed carriers; and a third carrier set determined except the first carrier set only including the licensed carriers and the second carrier set only including the licensed carriers, where the third carrier set includes the unlicensed carriers.

It is important to note that the modules may be implemented through software or hardware, and the latter condition may be implemented in, but not limited to, the following manners: the modules are all located in the same processors, or, the modules are located in multiple processors respectively.

An embodiment of the disclosure further provides a storage medium. Optionally, in the embodiment, the storage medium may be arranged to store a program code arranged to execute the following steps:

in S1, a base station sends first indication information to a terminal through a downlink control signaling format, where the first indication information is arranged to indicate a carrier set of which a CSI measurement result is required to be fed back by the terminal, and the carrier set includes unlicensed carriers.

in S2, the base station receives the CSI measurement result, fed back by the terminal, of the carrier set.

Optionally, the storage medium is further arranged to store a program code arranged to execute the following steps:

in S3, the terminal receives the first indication information sent by the base station through the downlink control signaling format, where the first indication information is arranged to indicate the carrier set of which the CSI measurement result is required to be fed back by the terminal, and the carrier set includes the unlicensed carriers; and in S4, the terminal feeds back the CSI measurement result of the carrier set to the base station.

Optionally, in the embodiment, the storage medium may include, but not limited to: various media capable of storing program codes such as a U disk, a ROM, a RAM, a mobile hard disk, a magnetic disk or an optical disk.

Optionally, in the embodiment, a processor executes S1 and S2 according to the program code stored in the storage medium.

Optionally, in the embodiment, the processor executes S3 and S4 according to the program code stored in the storage medium.

Optionally, examples in the embodiment may refer to the examples described in the abovementioned embodiments and optional implementation modes, and will not be elaborated in the embodiment.

The embodiments of the disclosure provide a nonperiodic CSI feedback triggering method, a feedback method and devices in combination with a characteristic of an unlicensed carrier and a nonperiodic CSI feedback method for LTE, so as to solve a problem about feedback of CSI measurement information of the unlicensed carrier.

For the problem existing in the related technology, in an optional embodiment, a CSI feedback triggering method is provided, which includes that: a base station sends CSI feedback triggering indication information of a corresponding unlicensed carrier to a terminal in a downlink control signaling format, the CSI feedback triggering indication information being arranged to indicate the terminal to feed back CSI.

The downlink control signaling format may be one or more existing DCI formats, and for example, may be at least one of a DCI format 0 or DCI format 4 arranged to indicate PUSCH transmission.

The CSI feedback triggering indication information of the corresponding unlicensed carrier is arranged to indicate at least one of the unlicensed carrier or licensed carrier on which the terminal is required to perform CSI measurement. A CSI feedback request identifier in the present DCI format 4 may still be used for indication without adding any other bit, but matching of high-layer RRC signaling is required, a set including unlicensed carriers is added in a CSI feedback set indicated by the high-layer signaling, and when the CSI feedback triggering indication information of the corresponding unlicensed carrier indicates that the terminal is required to feed back CSI of the unlicensed carrier, the carrier set indicated by the high-layer RRC signaling which is semi-statically sent includes the unlicensed carrier.

1 bit may be added in the high-layer RRC signaling, and is arranged to indicate whether the CSI feedback set includes the unlicensed carrier or not.

Optionally, the base station may further send a signaling indication to the terminal to notify the terminal of unlicensed carriers on which pilot signals configured for CSI measurement are actually sent in all the unlicensed carriers in the corresponding CSI feedback set, and the pilot signals may be at least one of Channel State Information-Reference Signals (CSI-RSs), Interference Measurement Resources (IMRs) or Cell-specific Reference Signals (CRSs).

The signaling indication arranged to notify the terminal of the unlicensed carriers on which the pilot signals are actually sent may adopt a bitmap manner, its length is the same as a number of carriers included in the CSI feedback carrier set, or its length is the same as a number of the unlicensed carriers included in the CSI feedback carrier set. In case of 1, it is indicated that the pilot signal is sent on the corresponding unlicensed carrier, and in case of 0, it is indicated that no pilot signal is sent on the corresponding unlicensed carrier.

For the CSI feedback triggering indication information of the corresponding unlicensed carrier. 1 bit may be added in the present DCI format 4 as a CSI feedback dynamic triggering identifier of the unlicensed carrier. If the bit is set to be 1, and meanwhile, is matched with the CSI feedback set semi-statically indicated by the high-layer RRC signaling, it is indicated that the terminal is triggered to feed back CSI of the unlicensed carriers in the CSI feedback set. If the bit is set to be 0, it is indicated that the terminal is not required to perform CSI feedback on the unlicensed carriers no matter whether the CSI feedback set semi-statically indicated by the high-layer RRC signaling includes the unlicensed carriers.

The CSI feedback triggering indication information of the corresponding unlicensed carrier may be a match of a bitmap with a length of multiple bits and the CSI feedback set semi-statically indicated by the high-layer RRC signaling, and 1 bit is set in the bitmap to indicate that CSI feedback is required to be performed on the corresponding unlicensed carrier in the CSI feedback set.

If the base station does not receive any CSI feedback from the terminal on schedule on a time-frequency resource indicated by the downlink control signaling format, the base station retriggers nonperiodic CSI feedback, and indicates a PUSCH carrier indication information field corresponding to retriggered nonperiodic CSI feedback to be one or more licensed carriers.

According to an aspect of the embodiments of the disclosure, a CSI feedback method is provided, which includes that: after a terminal receives CSI feedback triggering indication information and PUSCH sending carrier indication information of a corresponding unlicensed carrier from a base station, the terminal feeds back CSI acquired according to the CSI feedback triggering indication information to the base station on a carrier indicated by the PUSCH sending carrier indication information.

The carrier indicated by the PUSCH carrier indication information may be at least one of an unlicensed carrier or a licensed carrier. After receiving the PUSCH carrier indication information, the terminal may be required to known about a carrier corresponding to an indicated state according to all carrier information notified through high-layer RRC signaling.

The terminal acquires a carrier set on which the terminal is required by the base station to perform CSI feedback according to the received CSI feedback triggering indication information of the corresponding unlicensed carrier, and the carrier set may include at least one of one or more unlicensed carriers or one or more licensed carriers.

Optionally, the terminal sends a signaling indication arranged to notify the base station of unlicensed carriers which have been measured and of which CSI feedbacks has been successfully sent in unlicensed carriers on which CSI measurement is required to be performed to the base station.

The terminal may notify the base station of the unlicensed carriers which have been measured and of which the CSI feedbacks have been successfully sent in a bitmap manner, its length is the same as a number of carriers included in the CSI feedback carrier set, or its length is the same as a number of the unlicensed carriers included in the CSI feedback carrier set. In case of 1, it is indicated that measurement and CSI feedback sending are successfully completed on the corresponding unlicensed carrier, and in case of 0, it is indicated that no CSI feedback is successfully sent on the corresponding unlicensed carrier.

If the terminal may measure the CSI on the carrier set, a CSI feedback corresponding to the carrier set is obtained according to a CSI measurement result, and a PUSCH feedback is sent on the carrier indicated by the PUSCH carrier indication information, which may be at least one of a licensed carrier or an unlicensed carrier.

After the terminal learns about the carrier set on which CSI feedback is required to be performed, if CSI fails to be measured on one or more unlicensed carriers indicated by the set, the terminal may feed back no information at a resource position corresponding to a PUSCH indicated by the base station and sending a CSI feedback, or feeds back a new mode to indicate a CSI measurement failure.

Optionally, if there exist unlicensed carriers of which CSI fails to be measured and CSI feedback is not performed on these carriers, the terminal combines CSI feedback information according to a sequence of the CSI feedback set, and directly skip the unlicensed carriers which fails to be measured.

The new feedback mode may only include CQI information, and does not include any PMIRI feedback.

Optionally, a wideband CQI value in the new feedback module may be a preset value, for example, the value is 0, this new feedback mode may be called as a mode 1-0, this new feedback mode may not be a semi-statically preset feedback node, and only when the terminal fails to perform measurement or fails to feed back CSI of a certain carrier, this feedback mode is adopted.

After the terminal learns about the carrier set on which CSI feedback is required to be performed, if CSI measurement is completed, it is necessary to send a CSI measurement feedback on the carrier indicated by the PUSCH carrier indication information, if the indicated carrier is an unlicensed carrier, channel monitoring is performed before the PUSCH is sent on the unlicensed carrier, and if a channel monitoring result is busyness, the terminal fails to use the unlicensed carrier, and at this moment, the terminal fails to send any CSI feedback on schedule. If the channel monitoring result is idleness, the terminal may use the unlicensed carrier, and the terminal sends the CSI feedback on the unlicensed carrier according to an indication of a downlink control signaling format.

An optional embodiment of the disclosure will be described below in combination with the drawings.

High-layer RRC signaling semi-statically notifies carrier sets, i.e., a 1st set and a 2nd set, on which nonperiodic CSI feedback is required to be performed, set1 including 0/1/2/3/4/5 licensed carriers and 0/1 unlicensed carrier.

A PDCCH sent by a base station to a terminal on a downlink subframe n includes a DCI format 4, where a CSI request field is "01", and indicates the terminal to perform nonperiodic CSI feedback on all the carriers corresponding to the 1st set on an uplink subframe n+k, and k is a positive integer not smaller than 4; and a Carrier indicator field in the DCI format 4 is 3-bit, and indicates a licensed carrier x.

After receiving and performing blind detection on the PDCCH, the terminal learns about that the base station triggers nonperiodic CSI feedback over all the carriers in set1 including one unlicensed carrier, and should send a PUSCH including CSI feedback information on the subframe n+k and the licensed carrier x.

The terminal performs CSI measurement on all the carriers in set1 including the unlicensed carrier on the subframe n according to configuration information, received before, about CSI measurement pilots on the carriers. Since all signals sent on an unlicensed carrier are required to follow an LBT criterion, there exist two possibilities for CSI measurement of the terminal over the unlicensed carrier.

A first possibility: a pilot signal configured for CSI measurement is sent on the unlicensed carrier on the subframe n, the terminal may measure CSI information of the unlicensed carrier, and meanwhile, the terminal measures CSI information of the other licensed carriers in set1.

A second possibility: no signal is sent on the unlicensed carrier on the subframe n, the terminal fails to measure the CSI information of the unlicensed carrier, but the terminal may measure the CSI information of the other licensed carriers in set1.

For the first possibility, the terminal sends CSI feedbacks of all the carriers in set1 on the carrier x on the subframe n+k, where the CSI feedback of the unlicensed carrier is included.

For the second possibility, a new CSI feedback mode is defined: mode 1-0, that is, only a wideband CQI feedback is included, no PMI/RI feedback is included, and for the unlicensed carrier, the terminal feeds back the CSI feedback mode 1-0, and a wideband CQI=0, that is, the terminal only feeds back 1-bit information, and the value is 0. For the other licensed carriers in set1, the terminal may adopt any available CSI feedback mode in R8/9/10/11/12.

The base station receives the PUSCH sent by the terminal on the licensed carrier x on the subframe n+k, and demodulates a nonperiodic CSI feedback corresponding to set1 therein.

In the embodiment, each of the 1st set and 2nd set semi-statically notified by the high-layer RRC signaling is a bitmap with a length of 8 bits, the licensed carriers are indicated by the first 5 bits, and the last 3 bits may be arranged to indicate the unlicensed carrier.

Figure 17:
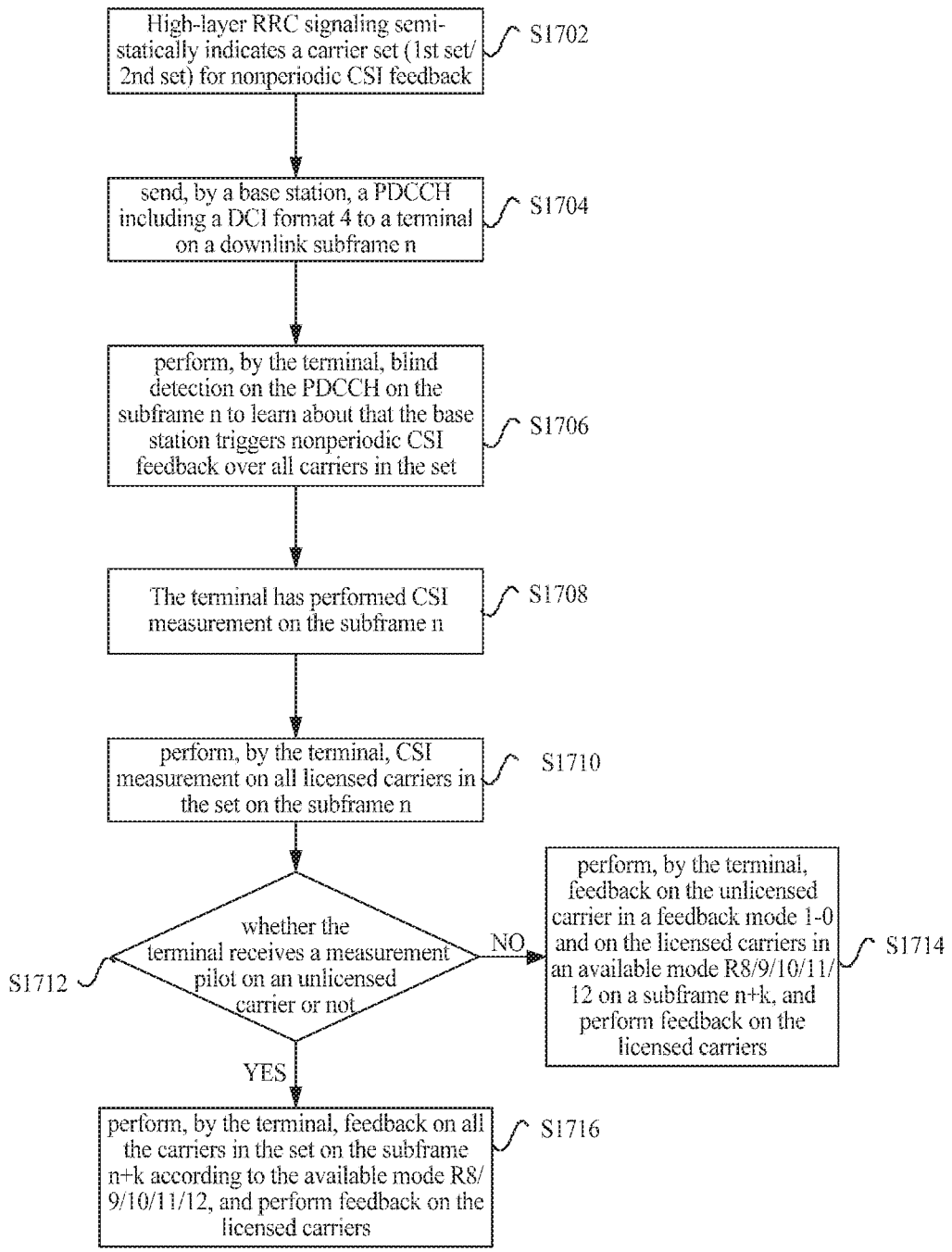
FIG. 17 is a flowchart of CSI feedback according to an embodiment of the disclosure.

FIG. 17 is a flowchart of CSI feedback according to an embodiment of the disclosure. As shown in FIG. 17, the flow includes the following steps.

In Step S1702, high-layer RRC signaling semi-statically indicates a carrier set 1st set/2nd set for nonperiodic CSI feedback.

In Step S1704, a base station sends a PDCCH including a DCI format 4 to a terminal on a downlink subframe n.

In Step S1706, the terminal performs blind detection on the PDCCH on the subframe n to learn about that the base station triggers nonperiodic CSI feedback over all carriers in the set.

In Step S1708, the terminal has performed CSI measurement on the subframe n.

In Step S1710, the terminal performs CSI measurement on all the carriers in the set on the subframe n.

In Step S1712, whether the terminal receives a measurement pilot on an unlicensed carrier or not is judged, Step S1714 is executed under the condition that a judgment result is NO, and Step S1716 is executed under the condition that the judgment result is YES.

In Step S1714, the terminal performs feedback on the unlicensed carrier in a feedback mode 1-0 and on unlicensed carriers in an available mode R8/9/10/11/12 on a subframe n+k, and performs feedback on the licensed carriers.

In Step S1716, the terminal performs feedback on all the carriers in the set on the subframe n+k according to the available mode R8/9/10/11/12, and performs feedback on the licensed carriers.

Another optional embodiment of the disclosure will be described below in combination with the drawings.

High-layer RRC signaling semi-statically notifies carrier sets, i.e., a 1st set and a 2nd set, on which nonperiodic CSI feedback is required to be performed, set1 including 0/1/2/3/4/5 licensed carriers and 0/1 unlicensed carrier.

A PDCCH sent by a base station to a terminal on a downlink subframe n includes a DCI format 4, where a CSI request field is "10", and indicates the terminal to perform nonperiodic CSI feedback on all the carriers corresponding to the 1st set on an uplink subframe n+k, and k is a positive integer not smaller than 4; and a Carrier indicator field in the DCI format 4 is 3-bit, and indicates an unlicensed carrier x.

After receiving and performing blind detection on the PDCCH, the terminal learns about that the base station triggers nonperiodic CSI feedback over all the carriers in set1 including one unlicensed carrier, and should send a PUSCH including CSI feedback information on the subframe n+k and the unlicensed carrier x.

The terminal performs CSI measurement on all the carriers in set1 including the unlicensed carrier on the subframe n according to configuration information, received before, about CSI measurement pilots on the carriers. Since all signals sent on an unlicensed carrier are required to follow an LBT criterion, there exist two possibilities for CSI measurement of the terminal over the unlicensed carrier.

A first possibility: a pilot signal configured for CSI measurement is sent on the unlicensed carrier on the subframe n, the terminal may measure CSI information of the unlicensed carrier, and meanwhile, the terminal measures CSI information of the other licensed carriers in set1.

A second possibility: no signal is sent on the unlicensed carrier on the subframe n, the terminal fails to measure the CSI information of the unlicensed carrier, but the terminal may measure the CSI information of the other licensed carriers in set1.

If a channel is monitored to be in an idle state through the LBT and the terminal may use the unlicensed carrier x on the subframe n+k, for the first possibility, the terminal sends CSI feedbacks of all the carriers in set1 on the carrier x on the subframe n+k, where the CSI feedback of the unlicensed carrier is included; and for the second possibility, a new CSI feedback mode is defined: mode 1-0, that is, only a wideband CQI feedback is included, no PMI/RI feedback is included, for the unlicensed carrier, the terminal feeds back the CSI feedback mode 1-0, and a wideband CQI=0, that is, the terminal only feeds back 1-bit information, and the value is 0, and for the other licensed carriers in set1, the terminal may adopt any available CSI feedback mode in R8/9/10/11/12.

The base station receives the PUSCH sent by the terminal on the unlicensed carrier x on the subframe n+k, and demodulates a nonperiodic CSI feedback corresponding to set1 therein.

If the channel is monitored to be in a busy state through the LBT and the terminal fails to use the unlicensed carrier x on the subframe n+k, the nonperiodic CSI feedback of the terminal in the DCI format 4 on the subframe n fails.

Optionally, if the base station does not receive any CSI feedback from the terminal on the subframe n+k on the licensed carrier x, the base station may retrigger nonperiodic CSI feedback for set1 on a subsequent downlink subframe m, but the Carrier indicator field may indicate a licensed carrier x during retriggering.

In the embodiment, each of the 1st set and 2nd set semi-statically notified by the high-layer RRC signaling is a bitmap with a length of 8 bits, the licensed carriers are indicated by the first 5 bits, and the last 3 bits may be arranged to indicate the unlicensed carrier.

Figure 18:
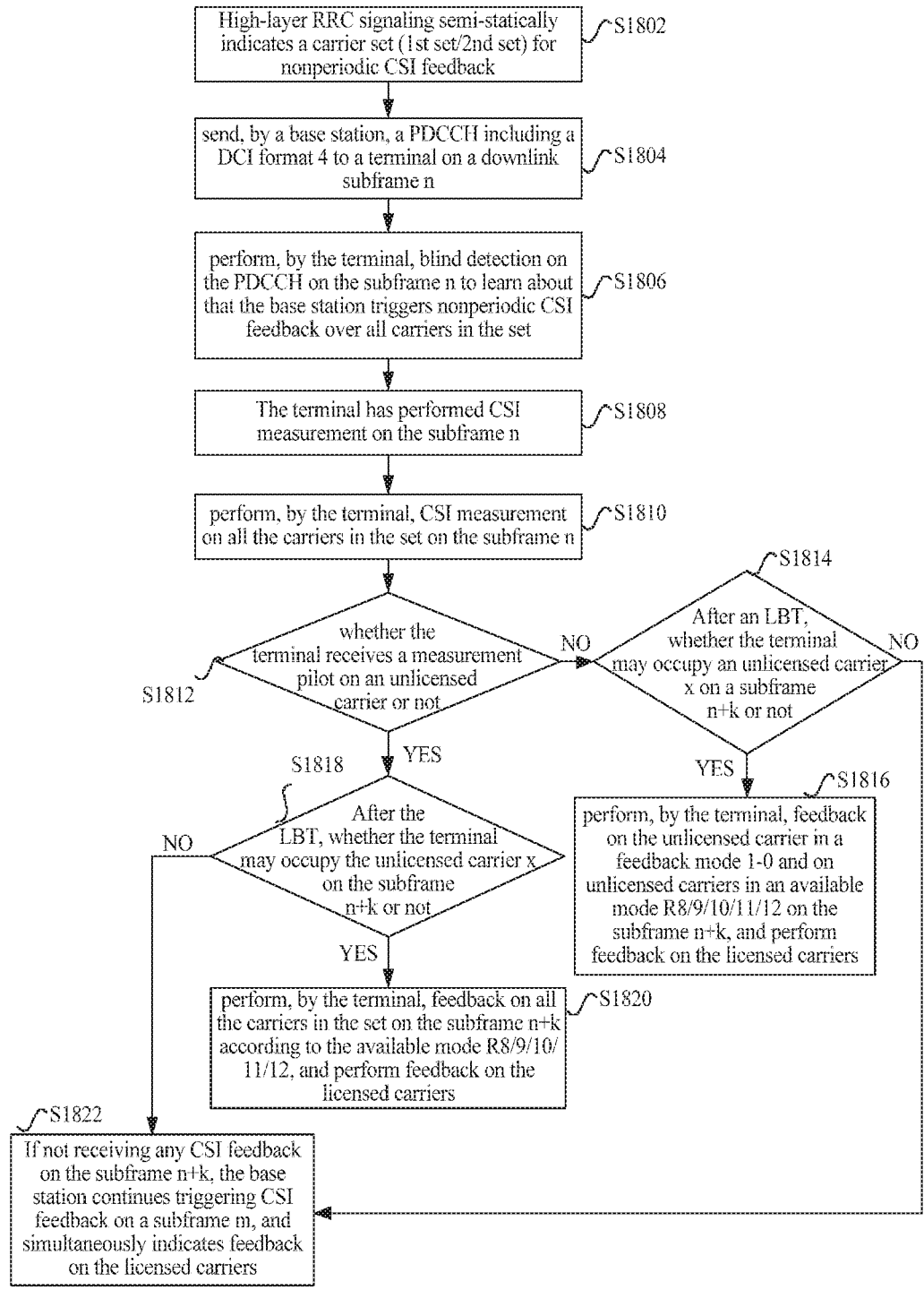
FIG. 18 is another flowchart of CSI feedback according to an embodiment of the disclosure.

FIG. 18 is another flowchart of CSI feedback according to an embodiment of the disclosure. As shown in FIG. 17, the flow includes the following steps.

In Step S1802, high-layer RRC signaling semi-statically indicates a carrier set 1st set/2nd set for nonperiodic CSI feedback.

In Step S1804, a base station sends a PDCCH including a DCI format 4 to a terminal on a downlink subframe n.

In Step S1806, the terminal performs blind detection on the PDCCH on the subframe n to learn about that the base station triggers nonperiodic CSI feedback over all carriers in the set.

In Step S1808, the terminal has performed CSI measurement on the subframe n.

In Step S1810, the terminal performs CSI measurement on all the carriers in the set on the subframe n.

In Step S1812, whether the terminal receives a measurement pilot on an unlicensed carrier or not is judged, Step S1814 is executed under the condition that a judgment result is NO, and Step S1816 is executed under the condition that the judgment result is YES.

In Step S1814, after an LBT, whether the terminal may occupy an unlicensed carrier x on a subframe n+k or not is judged, Step S1816 is executed under the condition that a judgment result is YES, and Step S1822 is executed under the condition that the judgment result is NO.

In Step S1816, the terminal performs feedback on the unlicensed carrier in a feedback mode 1-0 and on unlicensed carriers in an available mode R8/9/10/11/12 on the subframe n+k, and performs feedback on the licensed carriers.

In Step S1818, after the LBT, whether the terminal may occupy the unlicensed carrier x on the subframe n+k or not is judged, Step S1820 is executed under the condition that a judgment result is YES, and Step S1822 is executed under the condition that the judgment result is NO.

In Step S1820, the terminal performs feedback on all the carriers in the set on the subframe n+k according to the available mode R8/9/10/11/12, and performs feedback on the licensed carriers.

In Step S1822, if not receiving any CSI feedback on the subframe n+k, the base station continues triggering CSI feedback on a subframe m, and simultaneously indicates feedback on the licensed carriers.

An optional embodiment of the disclosure will be described below in combination with an example.

An "unlicensed carrier CSI feedback triggering" identifier is added into a DCI format 4, with a length of 1 bit. 0 indicates that unlicensed carrier CSI feedback is not triggered, and 1 indicates that unlicensed carrier CSI feedback is triggered. The identifier is matched with a CSI request field in the DCI format 4 and semi-static high-layer RRC signal for use, and there exist the following conditions:

a CSI request state is "10", an "unlicensed carrier CSI feedback triggering" state is 1, and it is indicated that a terminal is required to perform CSI measurement on an unlicensed carrier in a 1st set notified by the semi-static high-layer RRC signaling:

the CSI request state is "10", the "unlicensed carrier CSI feedback triggering" state is 0, and it is indicated that the terminal is not required to perform CSI measurement on the unlicensed carrier in the 1st set notified by the semi-static high-layer RRC signaling;

the CSI request state is "11", the "unlicensed carrier CSI feedback triggering" state is 1, and it is indicated that the terminal is required to perform CSI measurement on an unlicensed carrier in a 2nd set notified by the semi-static high-layer RRC signaling; and the CSI request state is "11", the "unlicensed carrier CSI feedback triggering" state is 0, and it is indicated that the terminal is not required to perform CSI measurement on the unlicensed carrier in the 2nd set notified by the semi-static high-layer RRC signaling.

In the embodiment, semi-static unlicensed carrier configuration is combined with dynamic unlicensed carrier CSI feedback triggering.

An optional embodiment of the disclosure will be described below in combination with an example.

An "unlicensed carrier CSI feedback triggering" identifier is added into a DCI format 4, a bitmap form may be adopted, and its length is the same as a number of carriers included in a 1st set or 2nd set notified by semi-static high-layer RRC signaling. The identifier is matched with a CSI request field in the DCI format 4 and the semi-static high-layer RRC signal for use, and there exist the following conditions:

a CSI request state is "10", the 1st set notified by the semi-static high-layer RRC signaling includes 4 carriers, an "unlicensed carrier CSI feedback triggering" state is "0000", and it is indicated that a terminal is required to perform CSI feedback on any unlicensed carrier;

the CSI request state is "10", the 1st set notified by the semi-static high-layer RRC signaling includes 4 carriers, the "unlicensed carrier CSI feedback triggering" state is "0010", and it is indicated that the third carrier in the 1st set notified by the semi-static high-layer RRC signaling is an unlicensed carrier and the terminal is required to perform CSI feedback on the unlicensed carrier:

the CSI request state is "10", the 1st set notified by the semi-static high-layer RRC signaling includes 4 carriers, the "unlicensed carrier CSI feedback triggering" state is "0110", and it is indicated that the second and third carriers in the 1st set notified by the semi-static high-layer RRC signaling are unlicensed carriers and the terminal is required to perform CSI feedback on the two unlicensed carriers;

the CSI request state is "11", the 2nd set notified by the semi-static high-layer RRC signaling includes 4 carriers, the "unlicensed carrier CSI feedback triggering" state is "0000", and it is indicated that the terminal is required to perform CSI feedback on any unlicensed carrier;

the CSI request state is "11", the 2nd set notified by the semi-static high-layer RRC signaling includes 4 carriers, the "unlicensed carrier CSI feedback triggering" state is "0010", and it is indicated that the third carrier in the 2nd set notified by the semi-static high-layer RRC signaling is an unlicensed carrier and the terminal is required to perform CSI feedback on the unlicensed carrier; and the CSI request state is "11", the 2nd set notified by the semi-static high-layer RRC signaling includes 4 carriers, the "unlicensed carrier CSI feedback triggering" state is "0110", and it is indicated that the second and third carriers in the 2nd set notified by the semi-static high-layer RRC signaling are unlicensed carriers and the terminal is required to perform CSI feedback on the two unlicensed carriers.

In the embodiment, semi-static unlicensed carrier configuration is combined with dynamic unlicensed carrier CSI feedback triggering, and CSI feedback over one or more than one unlicensed carrier may be supported.

An optional embodiment of the disclosure will be described below in combination with an example.

A terminal receives a DCI format 4 sent by a base station on a subframe n, and in combination with a carrier set notified in semi-static RRC signaling, the terminal is required to perform nonperiodic CSI feedback on a subframe n+k for a licensed carrier set [x] and an unlicensed carrier set [y], where each of x and y is a set including one or more carrier sequence numbers.

The terminal fails to measure a set [y0] because no pilot signal is monitored on the unlicensed carrier set [y0], then the terminal sends a bitmap in a PUSCH at the same time of feeding back CSI information of a carrier set [x y1] on a subframe n+k, a length being a length of the set [y] or [x y], where a position corresponding to a carrier in the [y0] is set to be 0, other positions are set to be 1, and it is indicated that no CSI information may be fed back for a [y0] carrier in the set [y].

From the above, by the CSI feedback method and device of the embodiments of the disclosure, the problem probably occurring on an unlicensed carrier that CSI fails to be measured or a PUSCH fails to be sent due to a failure in contention for a channel in the related technology is solved, and measurement of the terminal over the CSI of the unlicensed carrier and acquisition of the base station over the CSI measurement result of the unlicensed carrier are further implemented.

Obviously, those skilled in the art should know that each module or each step of the disclosure may be implemented by a universal computing device, and the modules or steps may be concentrated on a single computing device or distributed on a network formed by multiple computing devices, and may optionally be implemented by program codes executable for the computing devices, so that the modules or steps may be stored in a storage device for execution with the computing devices, the shown or described steps may be executed in sequences different from those shown or described here in some circumstances, or may form each integrated circuit module respectively, or multiple modules or steps therein may form a single integrated circuit module for implementation. Therefore, the disclosure is not limited to any specific hardware and software combination.

The above is only the optional embodiment of the disclosure and not intended to limit the application. For those skilled in the art, the application may have various modifications and variations. Any modifications, equivalent replacements, improvements and the like made within the spirit and principle of the application shall fall within the scope of protection of the application.

INDUSTRIAL APPLICABILITY

By the embodiments of the disclosure, the technical problem that CSI of an unlicensed carrier fails to be measured in the related technology is solved, and the technical effect that the base station may acquire the CSI measurement result, measured by the terminal, of the unlicensed carriers is further achieved.

The invention claimed is:

1. A method for measuring Channel State Information (CSI), the method comprising:

notifying, by a base station, a terminal to feed back a CSI measurement result of a carrier set, wherein the carrier set comprises unlicensed carriers; and receiving, by the base station, the CSI measurement result, fed back by the terminal, of the carrier set;

wherein notifying, by the base station, the terminal to feed back the CSI measurement result of the carrier set comprises:

sending, by the base station, first indication information to the terminal through at least one of a Physical Downlink Control Channel (PDCCH) or first high-layer Radio Resource Control (RRC) signaling, wherein the first indication information is arranged to indicate the carrier set;

the method further comprising: when sending, by the base station, the first indication information to the terminal through at least one of the PDCCH or the first high-layer RRC signaling, or, after sending, by the base station, the first indication information to the terminal through at least one of the PDCCH or the first high-layer RRC signaling, sending, by the base station, third indication information to the terminal, wherein the third indication information is arranged to indicate an unlicensed carrier, through which a pilot signal have been sent, in the unlicensed carriers;

wherein when the base station sends the first indication information to the terminal through at least one of the PDCCH or the first high-layer RRC signaling, under the condition that the base station sends the third indication information to the terminal, the first indication information and the third indication information are represented by different bits in the same indication information.

2. The method according to claim 1, wherein notifying, by the base station, the terminal to feed back the CSI measurement result of the carrier set comprises:

notifying, by the base station, the terminal to feed back the CSI measurement result of the carrier set through at least one of the PDCCH or the first high-layer RRC signaling.

3. The method according to claim 1, when sending, by the base station, the first indication information to the terminal through at least one of the PDCCH or the first high-layer RRC signaling, or, after sending, by the base station, the first indication information to the terminal through at least one of the PDCCH or the first high-layer RRC signaling, further comprising:
sending, by the base station, second indication information to the terminal, wherein the second indication information is arranged to indicate the unlicensed carriers in the carrier set.

4. The method according to claim 3, wherein sending, by the base station, the second indication information to the terminal comprises:
sending, by the base station, the second indication information to the terminal in a bitmap manner, wherein a length of the second indication information is the same as a number of carriers in the carrier set; or, the length of the second indication information is the same as a number of the unlicensed carriers in the carrier set.

5. The method according to claim 3, wherein, when the base station sends the first indication information to the terminal through at least one of the PDCCH or the first high-layer RRC signaling, under the condition that the base station sends the second indication information to the terminal, the first indication information and the second indication information are represented by different bits in the same indication information.

6. The method according to claim 1, when sending, by the base station, the first indication information to the terminal through at least one of the PDCCH or the first high-layer RRC signaling, or, after sending, by the base station, the first indication information to the terminal through at least one of the PDCCH or the first high-layer RRC signaling, further comprising:
sending, by the base station, fourth indication information to the terminal, wherein the fourth indication information is arranged to indicate whether the terminal is allowed to feed back the CSI measurement result of the carrier set or not.

7. The method according to claim 1,
before receiving, by the base station, the CSI measurement result, fed back by the terminal, of the carrier set, further comprising: indicating, by the base station, the terminal to feed back the CSI measurement result by adopting a first predetermined feedback mode; and
after receiving, by the base station, the CSI measurement result, fed back by the terminal, of the carrier set, further comprising: judging, by the base station, whether a feedback mode adopted for the CSI measurement result fed back by the terminal is the first feedback mode or not, and if it is not the first feedback mode, judging, by the base station, that the terminal fails to measure the carrier set.

8. A method for measuring Channel State Information (CSI), the method comprising:
receiving, by a terminal, notification information arranged to indicate the terminal to feed back a CSI measurement result of a carrier set from a base station, wherein the carrier set comprises unlicensed carriers; and
feeding back, by the terminal, the CSI measurement result of the carrier set to the base station;
wherein receiving, by the terminal, the notification information arranged to indicate the terminal to feed back the CSI measurement result of the carrier set from the base station comprises:
receiving, by the terminal, first indication information sent by the base station through at least one of a Physical Downlink Control Channel (PDCCH) or first high-layer Radio Resource Control (RRC) signaling, wherein the first indication information is arranged to indicate the carrier set;
the method further comprising: before feeding back, by the terminal, the CSI measurement result of the carrier set to the base station,
when the terminal receives the first indication information sent by the base station through at least one of the PDCCH or the first high-layer RRC signaling, or, after the terminal receives the first indication information sent by the base station through at least one of the PDCCH or the first high-layer signaling, receiving, by the terminal, second indication information sent by the base station, wherein the second indication information is arranged to indicate the unlicensed carriers in the carrier set;
finding, by the terminal, the unlicensed carriers indicated by the second indication information from the carrier set; and
measuring, by the terminal, CSI of an unlicensed carrier in a measurable state in the unlicensed carriers to obtain the CSI measurement result;
the method further comprising: before measuring, by the terminal, the CSI of the unlicensed carrier in the measurable state in the unlicensed carriers,
determining, by the terminal, an unlicensed carrier, though which a pilot signal have been sent, in the unlicensed carriers according to third indication information sent by the base station, wherein the unlicensed carrier through which the pilot signal have been sent is the unlicensed carrier in the measurable state, wherein the terminal receives the third indication information sent by the base station when receiving the first indication information sent by the base station through at least one of the PDCCH or the first high-layer RRC signaling, or, after receiving the first indication information sent by the base station through at least one of the PDCCH or the first high-layer RRC signaling.

9. The method according to claim 8, wherein receiving, by the terminal, the notification information arranged to indicate the terminal to feed back the CSI measurement result of the carrier set from the base station comprises: receiving, by the terminal, the notification information sent by the base station through at least one of the PDCCH or the first high-layer RRC signaling.

10. The method according to claim 8, when feeding back, by the terminal, the CSI measurement result of the carrier set to the base station, further comprising:
sending, by the terminal, fourth indication information to the base station, wherein the fourth indication information is arranged to indicate an unlicensed carrier which has been measured and of which a CSI measurement result has been successfully fed back.

11. The method according to claim 10, wherein sending, by the terminal, the fourth indication information to the base station comprises:
sending, by the terminal, the fourth indication information to the base station in a bitmap manner, wherein a length of the fourth indication information is the same as a number of carriers in the carrier set; or, the length of the fourth indication information is the same as a number of the unlicensed carriers in the carrier set.

12. The method according to claim 8, wherein feeding back, by the terminal, the CSI measurement result of the carrier set to the base station comprises:
   under the condition that the terminal fails to measure CSI of the carrier set, canceling, by the terminal, feedback of any information to the base station, or, feeding back, by the terminal, information indicating that the CSI of the carrier set is failed to be measured to the base station, or, feeding back, by the terminal, a preset Channel Quality Indicator (CQI) value to the base station.

13. The method according to claim 8, wherein feeding back, by the terminal, the CSI measurement result of the carrier set to the base station comprises:
   under the condition that the terminal completes measurement over CSI of a first unlicensed carrier in the carrier set, feeding back, by the terminal, a CSI measurement result of the first unlicensed carrier to the base station by adopting a first feedback mode indicated by the base station; and
   under the condition that the terminal fails to measure CSI of a second unlicensed carrier in the carrier set, feeding back, by the terminal, a CSI measurement result of the second unlicensed carrier to the base station by adopting a second predetermined feedback mode different from the first feedback mode, wherein the second feedback mode is arranged to indicate that the terminal fails to measure the CSI of the second unlicensed carrier.

14. The method according to claim 8, wherein the carrier set is one of:
   a carrier set obtained by adding the unlicensed carriers in a first carrier set only comprising licensed carriers or a second carrier set only comprising licensed carriers; and
   a third carrier set determined except the first carrier set only comprising the licensed carriers and the second carrier set only comprising the licensed carriers, wherein the third carrier set comprises the unlicensed carriers.

* * * * *